US 10,608,724 B2

United States Patent
Kim et al.

(10) Patent No.: US 10,608,724 B2
(45) Date of Patent: Mar. 31, 2020

(54) METHOD FOR REPORTING CSI IN WIRELESS COMMUNICATION SYSTEM AND DEVICE FOR SAME

(71) Applicant: LG ELECTRONICS INC., Seoul (KR)

(72) Inventors: Hyungtae Kim, Seoul (KR); Jonghyun Park, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/742,219

(22) PCT Filed: Jul. 13, 2016

(86) PCT No.: PCT/KR2016/007615
§ 371 (c)(1),
(2) Date: Jan. 5, 2018

(87) PCT Pub. No.: WO2017/014486
PCT Pub. Date: Jan. 26, 2017

(65) Prior Publication Data
US 2018/0219598 A1    Aug. 2, 2018

Related U.S. Application Data

(60) Provisional application No. 62/195,276, filed on Jul. 21, 2015, provisional application No. 62/199,241, filed on Jul. 31, 2015.

(51) Int. Cl.
*H04B 7/04*    (2017.01)
*H04B 7/06*    (2006.01)
*H04L 5/00*    (2006.01)

(52) U.S. Cl.
CPC ............. *H04B 7/0626* (2013.01); *H04B 7/04* (2013.01); *H04B 7/06* (2013.01); *H04B 7/0632* (2013.01); *H04B 7/0639* (2013.01); *H04L 5/0048* (2013.01)

(58) Field of Classification Search
CPC .. H04B 7/0626; H04B 7/0639; H04B 7/0632; H04B 7/06; H04B 7/04; H04L 5/0048
See application file for complete search history.

(56) References Cited

U.S. PATENT DOCUMENTS

| 2012/0201154 A1 | 8/2012 | Chandrasekhar et al. |
| 2013/0279460 A1 | 10/2013 | Kim et al. |
| 2015/0280801 A1* | 10/2015 | Xin ............... H04B 7/0478 370/329 |

FOREIGN PATENT DOCUMENTS

| KR | 10-2014-0135964 A | 11/2014 |
| WO | WO 2015/084094 A1 | 6/2015 |

OTHER PUBLICATIONS

Samsung, "CSI Reporting Types for Rel. 13 FD-MIMO," 3GPP TSG RAN WG1 Meeting #81, R1-153387, Fukuoka, Japan, May 25-29, 2015, pp. 1-5.

* cited by examiner

*Primary Examiner* — Moo Jeong
(74) *Attorney, Agent, or Firm* — Birch, Stewart, Kolasch & Birch, LLP

(57) ABSTRACT

Disclosed in the present invention is a method for reporting, by a terminal, channel status information (CSI) to a base station in a wireless communication system. The CSI reporting method is characterized by including the steps of: transmitting, to a base station, first CSI including a rank indicator in a first period unit; transmitting, to the base station, second CSI including a vertical precoding matrix index in a second period unit within the first period; and (Continued)

transmitting, to the base station, third CSI including horizontal precoding matrix index in a third period unit within the second period.

8 Claims, 33 Drawing Sheets

FIG. 5
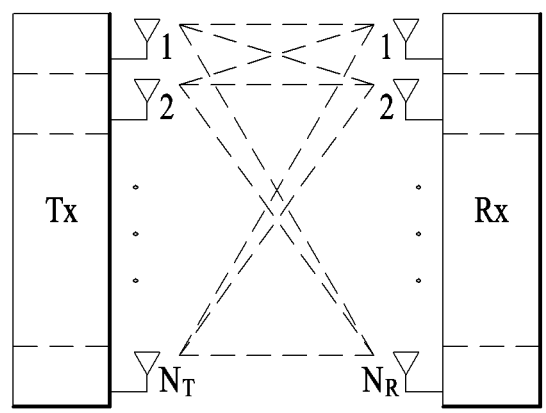
(a)
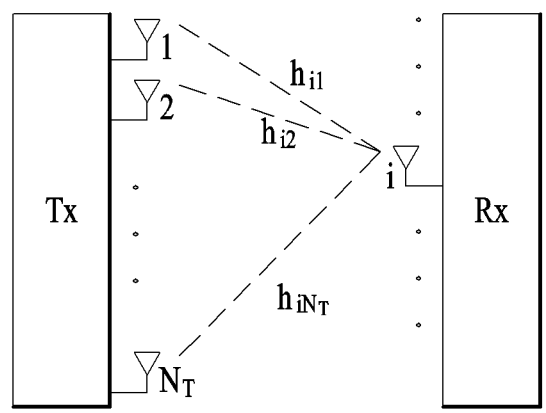
(b)

US 10,608,724 B2

METHOD FOR REPORTING CSI IN WIRELESS COMMUNICATION SYSTEM AND DEVICE FOR SAME

CROSS REFERENCE TO RELATED APPLICATIONS

This application is the National Phase of PCT International Application No. PCT/KR2016/007615, filed on Jul. 13, 2016, which claims priority under 35 U.S.C. 119(e) to U.S. Provisional Application No. 62/195,276, filed on Jul. 21, 2015 and No. 62/199,241, filed on Jul. 31, 2015, all of which are hereby expressly incorporated by reference into the present application.

TECHNICAL FIELD

The present invention relates to a wireless communication system, and more particularly, to a method of reporting CSI in a wireless communication system and an apparatus therefor.

BACKGROUND ART

MIMO (multi-input multi-output) technology corresponds to a technology for increasing data transmission and reception efficiency using a plurality of transmission antennas and a plurality of reception antennas instead of using a single transmission antenna and a single reception antenna. If a single antenna is used, a receiving end receives data through a single antenna path. On the contrary, if multiple antennas are used, the receiving end receives data through several paths, thereby enhancing transmission speed and transmission capacity and increasing coverage.

A single-cell MIMO operation can be divided into a single user-MIMO (SU-MIMO) scheme that a single user equipment (UE) receives a downlink signal in a single cell and a multi user-MIMO (MU-MIMO) scheme that two or more UEs receive a downlink signal in a single cell.

Channel estimation corresponds to a procedure of restoring a received signal by compensating a distortion of the signal distorted by fading. In this case, the fading corresponds to a phenomenon of rapidly changing strength of a signal due to multi-path time delay in wireless communication system environment. In order to perform the channel estimation, it is necessary to have a reference signal known to both a transmitter and a receiver. The reference signal can be simply referred to as an RS (reference signal) or a pilot depending on a standard applied thereto.

A downlink reference signal corresponds to a pilot signal for coherently demodulating PDSCH (physical downlink shared channel), PCFICH (physical control format indicator channel), PHICH (physical hybrid indicator channel), PDCCH (physical downlink control channel) and the like. A downlink reference signal can be classified into a common reference signal (CRS) shared by all UEs within a cell and a dedicated reference signal (DRS) used for a specific UE only. Compared to a legacy communication system supporting 4 transmission antennas (e.g., a system according to LTE release 8 or 9 standard), a system including an extended antenna configuration (e.g., a system according to LTE-A standard supporting 8 transmission antennas) is considering DRS-based data demodulation to efficiently manage a reference signal and support an enhanced transmission scheme. In particular, in order to support data transmission through an extended antenna, it may be able to define a DRS for two or more layers. Since a DRS and data are precoded by a same precoder, it is able to easily estimate channel information, which is used for a receiving end to demodulate data, without separate precoding information.

Although a downlink receiving end is able to obtain precoded channel information on an extended antenna configuration through a DRS, it is required for the downlink receiving end to have a separate reference signal except the DRS to obtain channel information which is not precoded. Hence, it is able to define a reference signal for obtaining channel state information (CSI), i.e., a CSI-RS, at a receiving end in a system according to LTE-A standard.

DISCLOSURE OF THE INVENTION

Technical Task

Based on the aforementioned discussion, a technical task of the present invention is to provide a method of reporting CSI in a wireless communication system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of reporting CSI (channel status information), which is reported by a user equipment to a base station in a wireless access system, includes the steps of transmitting first CSI including a rank indicator to the base station in a unit of a first period, transmitting second CSI including a vertical direction precoding matrix index to the base station in a unit of a second period within the first period, and transmitting third CSI including a horizontal direction precoding matrix index to the base station in a unit of a third period within the second period.

To further achieve these and other advantages and in accordance with the purpose of the present invention, according to a different embodiment, a method of receiving CSI (channel status information), which is received by a base station from a user equipment in a wireless access system, includes the steps of receiving first CSI including a rank indicator from the user equipment in a unit of a first period, receiving second CSI including a vertical direction precoding matrix index from the user equipment in a unit of a second period within the first period, and receiving third CSI including a horizontal direction precoding matrix index from the user equipment in a unit of a third period within the second period.

In addition, the second period may correspond to an N multiple of the third period.

Preferably, the vertical direction precoding matrix index included in the second CSI and the horizontal direction precoding matrix index included in the third CSI indicate a short-term precoder or a subband precoder. In this case, the first CSI can include a vertical direction precoding matrix index and a horizontal direction precoding matrix index indicating a long-term precoder or a wideband precoder.

More preferably, the third CSI includes a channel quality indicator. Or, the second CSI and the third CSI may include a channel quality indicator.

Advantageous Effects

According to embodiments of the present invention, a UE is able to efficiently report CSI in a wireless communication system, more particularly, a wireless communication system to which FD-MIMO or massive MIMO is applied.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for a configuration of a wireless communication system including a plurality of antennas;

BEST MODE

Mode for Invention

Figure 1:
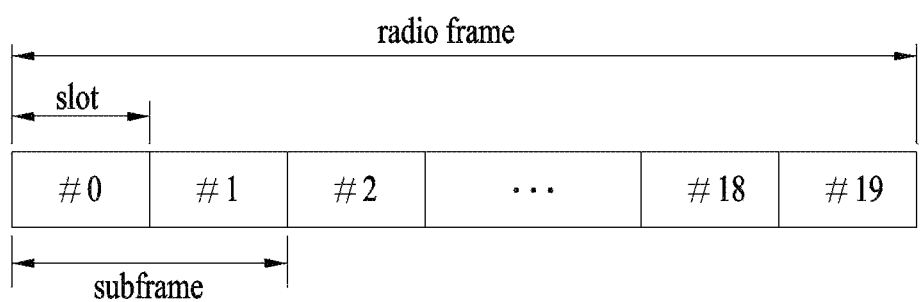
FIG. 1 is a diagram for a structure of a downlink radio frame.

The embodiments described in the following correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In this specification, embodiments of the present invention are described centering on the data transmission/reception relations between a user equipment and an eNode B. In this case, the eNode B may correspond to a terminal node of a network directly performing communication with the user equipment. In this disclosure, a specific operation explained as performed by an eNode B may be performed by an upper node of the eNode B in some cases.

In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like. A terminal may be substituted with such a terminology as a relay node (RN), a relay station (RS), and the like. And, a terminal may be substituted with such a terminology as a user equipment (UE), a mobile station (MS), a mobile subscriber station (MSS), and the like.

Specific terminologies used in the following description are provided to help understand the present invention and the use of the specific terminologies can be modified into a different form in a range of not deviating from the technical idea of the present invention.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

A structure of a downlink radio frame is explained in the following with reference to FIG. 1.

Referring to FIG. 1, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 1 is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol period. The OFDM symbol may be referred to as SC-FDMA symbol or symbol period. The resource block (RB) as a resource allocation unit may include a plurality of continuous subcarriers in one slot.

The number of OFDM symbols included in one slot may vary depending on a configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first two or three OFDM symbols of each subframe may be allocated to a physical downlink control channel (PDCCH), and the other OFDM symbols may be allocated to a physical downlink shared channel (PDSCH).

The aforementioned structure of a radio frame is just an example only. The number of subframes included in a radio frame, the number of slots included in a subframe and the number of symbols included in a slot may be modified in various ways.

Figure 2:
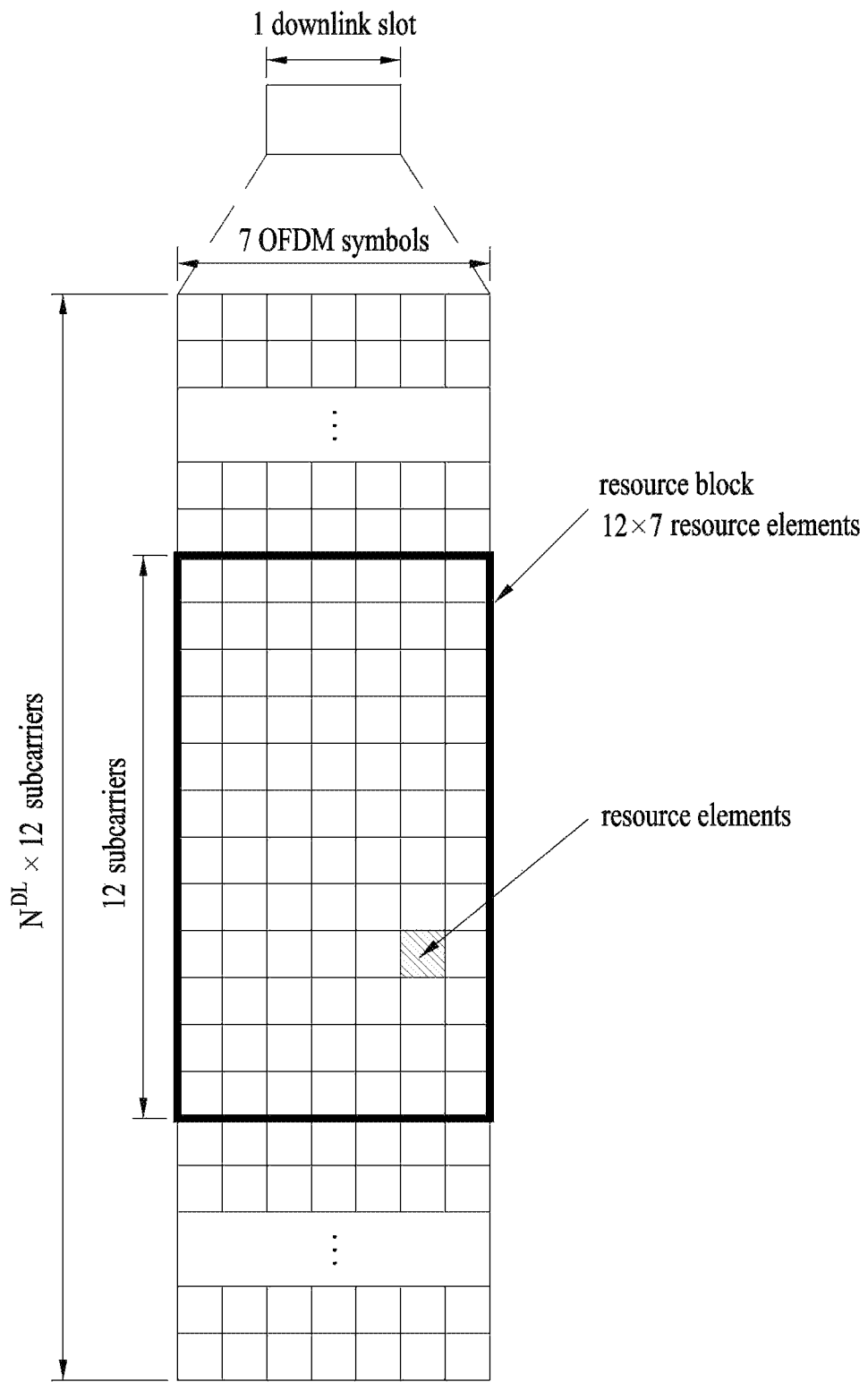
FIG. 2 is a diagram for an example of a resource grid of a downlink slot.

FIG. 2 is a diagram for an example of a resource grid of a downlink slot. FIG. 2 shows a case that an OFDM symbol is configured by a normal CP. Referring to FIG. 2, a downlink slot includes a plurality of OFDM symbols in a time domain and a plurality of resource blocks in a frequency domain. In this case, although FIG. 2 illustrates that a downlink slot includes seven OFDM symbols and a resource block includes twelve subcarriers, by which the present invention may be non-limited. Each element on the resource grid will be referred to as a resource element (RE). For example, an RE a (k, l) may correspond to an RE positioned at a $k^{th}$ subcarrier and an $l^{th}$ OFDM symbol. In case of a normal CP, one resource block includes 12*7 resource elements (in case of an extended CP, one resource block includes 12*6 resource elements). Since a space between subcarriers corresponds to 15 kHz, one resource block includes about 180 kHz in frequency domain. $N_{DL}$ corresponds to the number of resource blocks included in a downlink slot. A value of the $N_{DL}$ can be determined according to a downlink transmission bandwidth scheduled by a base station.

Figure 3:
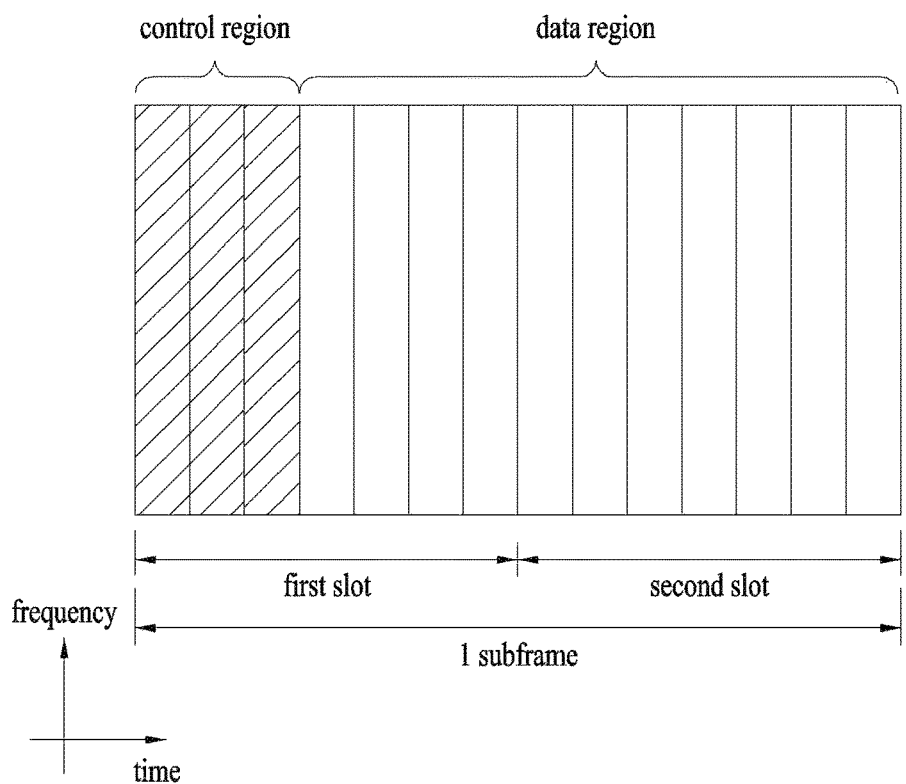
FIG. 3 is a diagram for structure of a downlink subframe.

FIG. 3 is a diagram illustrating a structure of a downlink subframe. Referring to FIG. 3, maximum three OFDM symbols located at the front of the first slot of a subframe correspond to a control region to which a control channel is allocated. The other OFDM symbols correspond to a data region to which a physical downlink shared channel (PDSCH) is allocated. A basic unit of transmission becomes one subframe. In particular, PDCCH and PDSCH are assigned over two slots. Examples of downlink control channels used in the 3GPP LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK signals in response to uplink transmission. The control information transmitted through the PDCCH will be referred to as downlink control information (DCI). The DCI includes uplink or downlink scheduling information, uplink transmission (Tx) power control command for a random UE group and the like. The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on a correlation between the number of CCEs and a coding rate provided by the CCE. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 4:
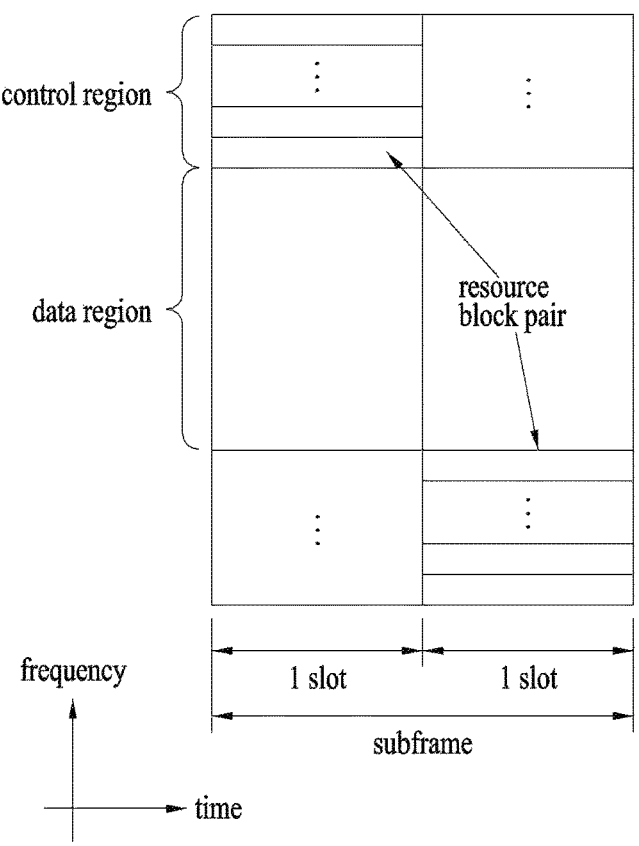
FIG. 4 is a diagram for structure of an uplink subframe.

FIG. 4 is a diagram for structure of an uplink subframe. Referring to FIG. 4, a UL subframe may be divided into a control region and a data region in a frequency domain. A physical uplink control channel (PUCCH) including uplink control information is allocated to the control region and a physical uplink shared channel (PUSCH) including user data is allocated to the data region. In order to maintain single carrier property, a UE does not transmit the PUCCH and the PUSCH at the same time. The PUCCH for one UE is allocated to a resource block pair in a subframe. The resource blocks belonging to the resource block pair occupy a different subcarrier with respect to two slots. This is represented as the resource block pair allocated to the PUCCH is frequency-hopped at a slot boundary.

MIMO System Modeling

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

FIG. 5 illustrates the configuration of a typical MIMO communication system. A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \qquad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 5. Regarding a transmission signal, up to $N_T$ pieces of information can be transmitted through the $N_T$ Tx antennas, as expressed as the following vector.

$$s = [s_1, s_2, \ldots, s_{N_T}]^T \qquad \text{[Equation 2]}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector $\hat{s}$ may be expressed below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Meanwhile, NT transmission signals $x_1, x_2, \ldots, x_{N_T}$ to be actually transmitted may be configured by multiplying the transmission power-controlled information vector $\hat{S}$ by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $w_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Equation 5]}$$

$$W\hat{s} = WPs$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R) \qquad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \qquad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

CSI Feedback

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI in order to obtain multiplexing gain of MIMO antennas. To acquire CSI from the UE, the eNB transmits RSs to the UE and commands the UE to feed back CSI measured based on the RSs through a PUCCH or a PUSCH.

CSI is divided into three types of information: an RI, a PMI, and a CQI. First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

An advanced system such as an LTE-A system considers additional multi-user diversity through multi-user MIMO (MU-MIMO). Due to interference between UEs multiplexed in an antenna domain in MU-MIMO, the accuracy of CSI may significantly affect interference with other multiplexed UEs as well as a UE that reports the CSI. Accordingly, more accurate CSI than in single-user MIMO (SU-MIMO) should be reported in MU-MIMO.

In this context, the LTE-A standard has determined to separately design a final PMI as a long-term and/or wideband PMI, W1, and a short-term and/or subband PMI, W2.

For example, a long-term covariance matrix of channels expressed as Equation 8 may be used for hierarchical codebook transformation that configures one final PMI with W1 and W2.

$$W = \text{norm}(W1\,W2) \qquad \text{[Equation 8]}$$

In Equation 8, W2 is a short-term PMI, which is a codeword of a codebook reflecting short-term channel information, W is a codeword of a final codebook, and norm(A) is a matrix obtained by normalizing each column of matrix A to 1.

Conventionally, the codewords W1 and W2 are given as Equation 9.

$$W1(i) = \begin{bmatrix} X_i & 0 \\ 0 & X_i \end{bmatrix}, \text{ where } X_i \text{ is } Nt/2 \text{ by } M \text{ matrix} \qquad \text{[Equation 9]}$$

$$W2(j) = \overbrace{\begin{bmatrix} e_M^k & e_M^l & & e_M^m \\ & & \cdots & \\ \alpha_j e_M^k & \beta_j e_M^l & & \gamma_j e_M^m \end{bmatrix}}^{r\text{columns}} \text{ (if rank} = r\text{),}$$

where $1 \leq k, l, m \leq M$ and $k, l, m$ are intege where Nt is the number of Tx antennas, M is the number of columns of a matrix Xi, indicating that the matrix Xi includes a total of M candidate column vectors. eMk, eMl, and eMm denote k-th, l-th, and m-th column vectors of the matrix Xi in which only k-th, l-th, and m-th elements among M elements are 0 and the other elements are 0, respectively. $\alpha_j$, $\beta_j$, and $\gamma_j$ are complex values each having a unit norm and indicate that, when the k-th, l-th, and m-th column vectors of the matrix Xi are selected, phase rotation is applied to the column vectors. At this time, i is an integer greater than 0, denoting a PMI index indicating W1 and j is an integer greater than 0, denoting a PMI index indicating W2.

In Equation 9, the codewords are designed so as to reflect correlation characteristics between established channels, if cross-polarized antennas are densely arranged, for example, the distance between adjacent antennas is equal to or less than half a signal wavelength. The cross-polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is quantized values of channels, it is necessary to design a codebook reflecting channel characteristics. For convenience of description, a rank-1 codeword designed in the above manner may be given as Equation 10.

$$W1(i) * W2(j) = \begin{bmatrix} X_i(k) \\ \alpha_j X_i(k) \end{bmatrix}$$ [Equation 10]

In Equation 10, a codeword is expressed as an $N_T \times 1$ vector where NT is the number of Tx antennas and the codeword is composed of an upper vector $X_i(k)$ and a lower vector $\alpha_j X_i(k)$, representing the correlation characteristics of the horizontal and vertical antenna groups, respectively. $X_i(k)$ is expressed as a vector having the linear phase increment property, reflecting the correlation characteristics between antennas in each antenna group. For example, a discrete Fourier transform (DFT) matrix may be used for $X_i(k)$.

As mentioned in the foregoing description, channel state information (CSI) includes CQI, PMI, RI, and the like in LTE system. All or a part of the CQI, the PMI, and the RI is transmitted depending on a transmission mode of a UE. When the CSI is periodically transmitted, it is referred to as periodic reporting. When the CSI is transmitted upon the request of a base station, it is referred to as aperiodic reporting. In case of the aperiodic reporting, a request bit, which is included in uplink scheduling information transmitted by a base station, is transmitted to a UE. The UE forwards CSI to the base station via a data channel (PUSCH) in consideration of a transmission mode of the UE. In case of the periodic reporting, a period and an offset in the period are signaled in a unit of a subframe according to a UE using a semi-static scheme via higher layer signaling. A UE forwards CSI to a base station via an uplink control channel (PUCCH) according to a determined period in consideration of a transmission mode. If uplink data exists at the same time in a subframe in which CSI is transmitted, the CSI is transmitted via an uplink data channel (PUSCH) together with the data. The base station transmits transmission timing information appropriate for a UE to the UE in consideration of a channel status of each UE, a UE distribution status in a cell, and the like. The transmission timing information includes a period for transmitting CSI, offset, and the like and can be transmitted to each UE via an RRC message.

LTE system includes 4 types of CQI reporting mode. Specifically, the CQI reporting mode is divided into WB CQI and SB CQI according to a CQI feedback type and is divided into no PMI and single PMI depending on whether PMI is transmitted or not. In order to periodically report CQI, each UE receives information consisting of a combination of a period and an offset via RRC signaling.

CSI reporting types defined in LTE release-10 are described in the following.

A type 1 report supports CQI feedback for a UE on a selected subband. A type 1a report supports subband CQI and second PMI feedback. A type 2, a type 2b, and a type 2c reports support wideband CQI and PMI feedback. A type 2a report supports wideband PMI feedback. A type 3 report supports RI feedback. A type 4 report supports wideband CQI. A type 5 report supports RI and wideband PMI feedback. A type 6 report supports RI and PTI (precoding type indicator) feedback.

Massive MIMO

A recent wireless communication system considers introducing an active antenna system (hereinafter, AAS). Unlike a legacy passive antenna system that an amplifier capable of adjusting a phase and a size of a signal is separated from an antenna, the AAS corresponds to a system that each antenna is configured as an active antenna including such an active circuit as an amplifier. Since the AAS uses an active antenna, it is not necessary for the AAS to have a separate cable for connecting an amplifier with an antenna, a connector, other hardware, and the like. Hence, the AAS has characteristics that efficiency is high in terms of energy and management cost. In particular, since the AAS supports an electronic beam control scheme according to each antenna, the AAS enables an evolved MIMO technique such as forming a delicate beam pattern in consideration of a beam direction and a beam width, forming a 3D beam pattern, and the like.

As the evolved antenna system such as the AAS and the like is introduced, a massive MIMO structure including a plurality of input/output antennas and multi-dimensional antenna structure are also considered. As an example, in case of forming a 2D antenna array instead of a legacy straight antenna array, it may be able to form a 3D beam pattern by the active antenna of the AAS.

Figure 6:
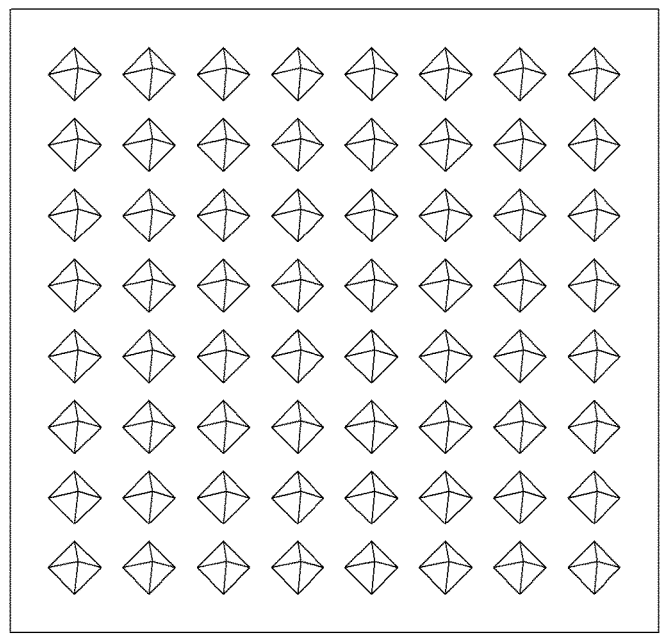
FIG. 6 illustrates a 2D active antenna system having 64 antenna elements.

FIG. 6 illustrates a 2D active antenna system having 64 antenna elements.

Referring to FIG. 6, it is able to see that $N_t = N_v \cdot N_h$ number of antennas fat us a shape of square. In particular, $N_h$ and $N_v$ indicate the number of antenna columns in horizontal direction and the number of antenna rows in vertical direction, respectively.

If the 3D beam pattern is utilized in the aspect of a transmission antenna, it may be able to perform semi-static or dynamic beam forming not only in horizontal direction but also in vertical direction of a beam. As an example, it may consider such an application as sector forming in vertical direction and the like. In the aspect of a reception antenna, when a reception beam is formed using massive antennas, it may be able to expect a signal power increasing effect according to an antenna array gain. Hence, in case of uplink, an eNB is able to receive a signal transmitted from a UE through a plurality of antennas. In this case, in order to reduce interference impact, the UE can configure transmit power of the UE to be very low in consideration of a gain of massive reception antennas.

Figure 7:
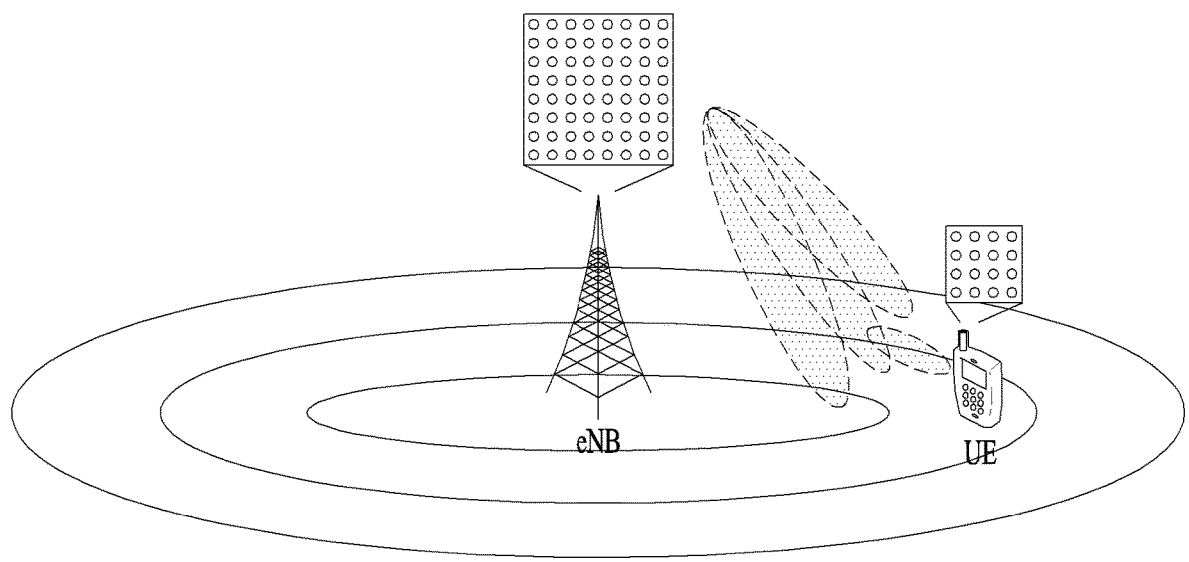
FIG. 7 illustrates a 3D-MIMO system utilizing 2D-AAS.

FIG. 7 illustrates a 3D-MIMO system utilizing 2D-AAS. In particular, FIG. 7 shows a system that an eNB or a UE has a plurality of transmission/reception antennas capable of forming an AAS-based 3D beam.

Figure 8:
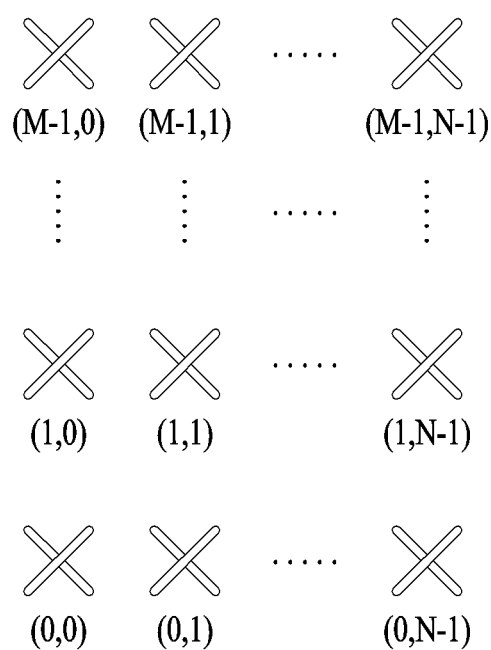
FIG. 8 is a diagram for a 2D-AAS model considering polarization characteristic of antenna array.

FIG. 8 is a diagram for a 2D-AAS model considering polarization characteristic of antenna array.

In FIG. 8, each antenna array is represented by (M, N, P). The M corresponds to the number of antenna elements having the same polarization in each column, the N corresponds to the number of columns in horizontal direction, and the P corresponds to the number of dimensions of polarization. In particular, in case of cross-polarization shown in FIG. 8, the P corresponds to 2.

Figure 9:
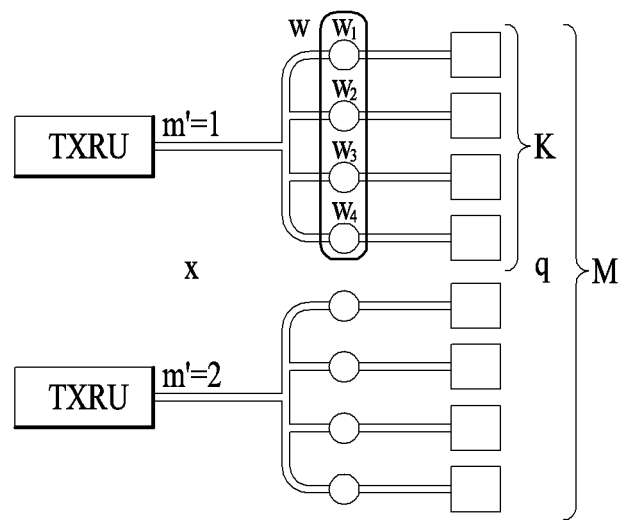
FIGS. 9 and 10 illustrate examples of a TXRU (transceiver units) model.
Figure 10:
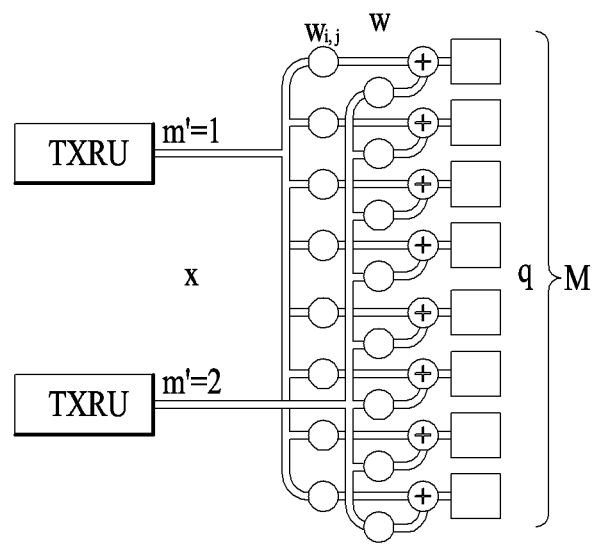

FIGS. 9 and 10 illustrate examples of a TXRU (transceiver units) model.

A TXRU configuration corresponding to the antenna array configuration (M, N, P) of FIG. 8 can be represented by ($M_{TXRU}$, N, P). The $M_{TXRU}$ corresponds to the number of TXRUs existing on the same column and the same polarization and satisfies $M_{TXRU} \leq M$ all the time.

A TXRU model is defined by a relation between a signal of a TXRU and a signal of an antenna element. In this case, in FIGS. 9 and 10, q corresponds to a transmission signal vector of the M number of antenna elements having the same polarization in the same column, w and W correspond to a wideband TXRU weighted vector and a matrix, respectively, and x corresponds to a signal vector of $M_{TXRU}$ TXRUs.

The w and the W correspond to analog beamforming capable of being semi-statically changed by a base station based on long-term channel information. In this case, a UE does not know the w and the W. Since a single CSI-RS port set to the UE is mapped to a single TXRU, the UE feed backs a phase difference between CSI-RS ports capable of maximizing SINR via a PMI report. Consequently, a base station receives feedback on a phase difference between TXRUs from the UE, controls the phase difference between the TXRUs based on the feedback, and performs digital beamforming.

A TXRU model can be divided into a subarray model shown in FIG. 8 and a full-connection model shown in FIG. 10 according to a correlation between an antenna element and a TXRU. And, when mapping is performed between CSI-RS ports and TXRUs, the mapping can be performed in a manner that 1-to-1 or 1-to-many. If the number of TXRUs corresponds to Q, an antenna configuration of the entire 2D AAS can be represented as (M, N, P, Q).

Meanwhile, if a horizontal direction channel and a vertical direction channel are independently measured and fed back (2D-AAS), it may be able to define $W_{1H}$ and $W_{2H}$ corresponding to PMI indicating the horizontal direction channel and $W_{1V}$ and $W_{2V}$ corresponding to PMI indicating the vertical direction channel. In this case, it is necessary to introduce a new reporting type according to a PUCCH CSI reporting mode. A UE feed backs CSI information to a base station via PUCCH according to a CSI reporting mode configured via RRC signaling.

Based on the aforementioned discussion, the present invention proposes PUCCH CSI reporting modes capable of being applied to 2D-AAS.

Embodiment 1

The embodiment 1 of the present invention relates to a submode A of a PUCCH CSI reporting mode 1-1 of LTE-A system. Before the present invention is explained, a submode A of a legacy PUCCH CSI reporting mode 1-1 is explained.

Figure 11:
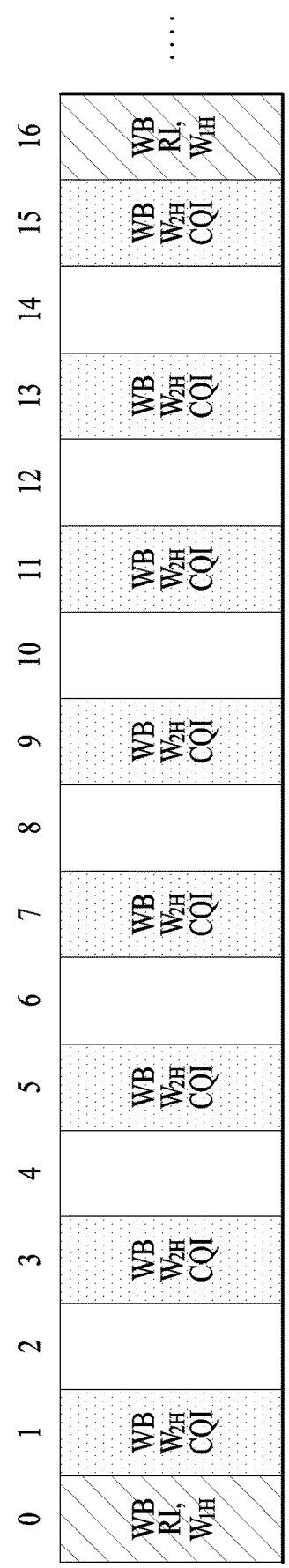
FIG. 11 illustrates an operation example for a submode A of a PUCCH CSI report mode 1-1 of a legacy LTE-A system.

FIG. 11 illustrates an operation example for a submode A of a PUCCH CSI report mode 1-1 of a legacy LTE-A system.

Referring to FIG. 11, a feedback period ($N_{pd}$) of CQI corresponds to 2 subframes. Feedback starts at a subframe #1 and the subframe #1 is shaded in FIG. 11. In the present specification, the subframe is referred to as CQI reporting timing.

A feedback period of an RI corresponds to 2*8 subframes and feedback starts at a subframe #0. In a legacy LTE-A system, a base station has horizontal direction antennas only arrayed in one dimension. Hence, all feedback W indicates channel components in horizontal direction. When an RI is fed back, $W_{1H}$ is fed back together. Both the RI and the $W_{1H}$ correspond to WB (wideband) information. When CQI is fed back, $W_{2H}$ is fed back together. Both the CQI and the $W_{2H}$ correspond to WB (wideband) information.

Figure 12:
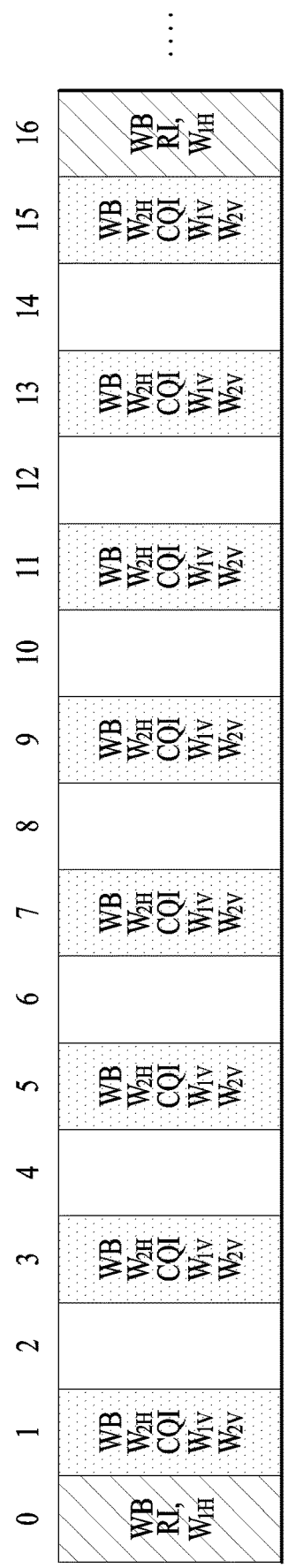
FIG. 12 illustrates an example for a submode A of a PUCCH CSI report mode 1-1 according to a first embodiment of the present invention.

FIG. 12 illustrates an example for a submode A of a PUCCH CSI report mode 1-1 according to a first embodiment of the present invention. In particular, FIG. 12 shows a modified reporting type of the submode A when vertical direction PMI (i.e., $W_{1V}$ and $W_{2V}$) for FD-MIMO is added on the basis of a legacy submode A.

Referring to FIG. 12, when CQI feedback is performed, $W_{2H}$, $W_{1V}$, and $W_{2V}$ are fed back together and all of the $W_{2H}$, the $W_{1V}$, and the $W_{2V}$ correspond to WB (wideband) information. If the WB information is transmitted using a PUCCH format 2, in order to maintain a payload size with a size equal to or less than 11 bits, PMI subsampling is applied to the $W_{2H}$, the $W_{1V}$, and the $W_{2V}$ before the $W_{2H}$, the $W_{1V}$, and the $W_{2V}$ are fed back.

In FIG. 12, W2 information is divided into the $W_{2H}$ and the $W_{2V}$. Yet, it may configure a single W2 codebook without dividing the W2 information into the $W_{2H}$ and the $W_{2V}$. In this case, according to the proposed reporting type, the $W_{2H}$ is replaced with W2 and the $W_{2V}$ is not reported. In FIG. 12, W1 information is divided into the $W_{1H}$ and the $W_{1V}$. Yet, it may configure a single W1 codebook without dividing the W1 information into the $W_{1H}$ and the $W_{1V}$. In this case, the $W_{1H}$ transmitted together with the RI is replaced with W1 and the $W_{1V}$ is not reported.

Figure 13:
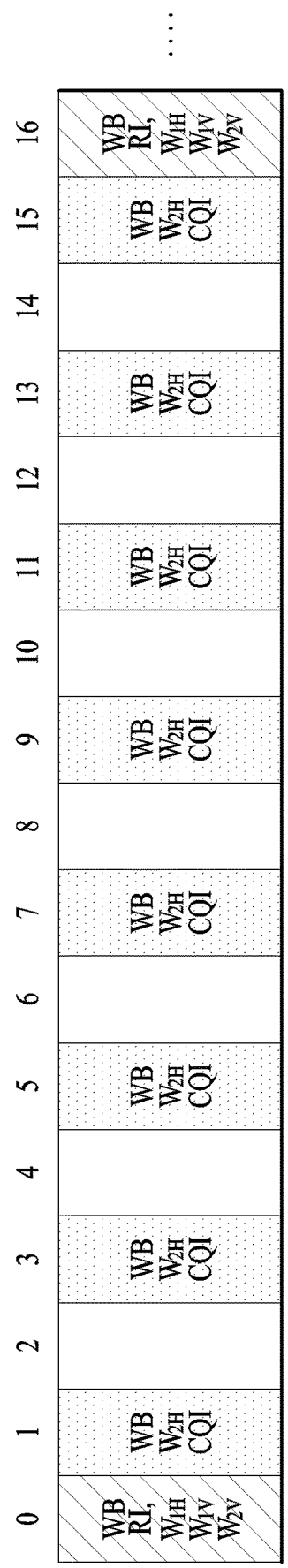
FIG. 13 illustrates a different example for a submode A of a PUCCH CSI report mode 1-1 according to a first embodiment of the present invention.

FIG. 13 illustrates a different example for a submode A of a PUCCH CSI report mode 1-1 according to a first embodiment of the present invention. In particular, FIG. 13 shows a modified reporting type of the submode A when vertical direction PMI (i.e., $W_{1V}$ and $W_{2V}$) for FD-MIMO is added on the basis of a legacy submode A.

Referring to FIG. 13, when RI feedback is performed, $W_{1H}$, $W_{1V}$, and $W_{2V}$ are fed back together and all of the $W_{1H}$, the $W_{1V}$, and the $W_{2V}$ correspond to WB (wideband) information. If the WB information is transmitted using a PUCCH format 2, in order to maintain a payload size with a size equal to or less than 11 bits, PMI subsampling is applied to the $W_{1H}$, the $W_{1V}$, and the $W_{2V}$ before the $W_{1H}$, the $W_{1V}$, and the $W_{2V}$ are fed back.

In FIG. 13, W1 information is divided into the $W_{1H}$ and the $W_{1V}$. Yet, it may configure a single W1 codebook without dividing the W1 information into the $W_{1H}$ and the $W_{1V}$. In this case, according to the proposed reporting type, the $W_{1H}$ is replaced with W1 and the $W_{1V}$ is not reported. In FIG. 13, W2 information is divided into the $W_{2H}$ and the $W_{2V}$. Yet, it may configure a single W2 codebook without dividing the W2 information into the $W_{2H}$ and the $W_{2V}$. In this case, the $W_{2H}$ transmitted together with the CQI is replaced with W2 and the $W_{2V}$ is not reported.

Figure 14:
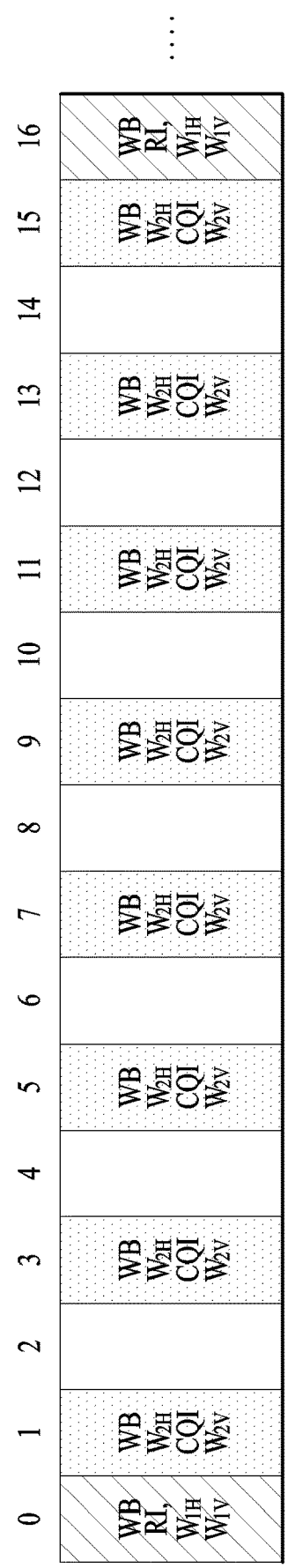
FIG. 14 illustrates a further different example for a submode A of a PUCCH CSI report mode 1-1 according to a first embodiment of the present invention.

FIG. 14 illustrates a further different example for a submode A of a PUCCH CSI report mode 1-1 according to a first embodiment of the present invention. In particular, FIG. 14 shows a modified reporting type of the submode A when vertical direction PMI (i.e., $W_{1V}$ and $W_{2V}$) for FD-MIMO is added on the basis of a legacy submode A.

Referring to FIG. 14, when RI feedback is performed, $W_{1H}$ and $W_{1V}$ are fed back together. When CQI feedback is performed, $W_{2H}$ and $W_{2V}$ are fed back together. All of the $W_{1H}$, the $W_{1V}$, the $W_{2H}$, and the $W_{2V}$ correspond to WB (wideband) information. If the WB information is transmitted using a PUCCH format 2, in order to maintain a payload size with a size equal to or less than 11 bits, PMI subsampling is applied to the $W_{1H}$, the $W_{1V}$, the $W_{2H}$, and the $W_{2V}$ before the $W_{1H}$, the $W_{1V}$, the $W_{2H}$, and the $W_{2V}$ are fed back.

In FIG. 14, W1 information is divided into the W1H and the $W_{1V}$. Yet, it may configure a single W1 codebook without dividing the W1 information into the $W_{1H}$ and the $W_{1V}$. In this case, according to the proposed reporting type, the $W_{1H}$ is replaced with W1 and the $W_{1V}$ is not reported. In FIG. 14, W2 information is divided into the $W_{2H}$ and the $W_{2V}$. Yet, it may configure a single W2 codebook without dividing the W2 information into the $W_{2H}$ and the $W_{2V}$. In this case, the $W_{2H}$ transmitted together with the CQI is replaced with W2 and the $W_{2V}$ is not reported.

Figure 15:
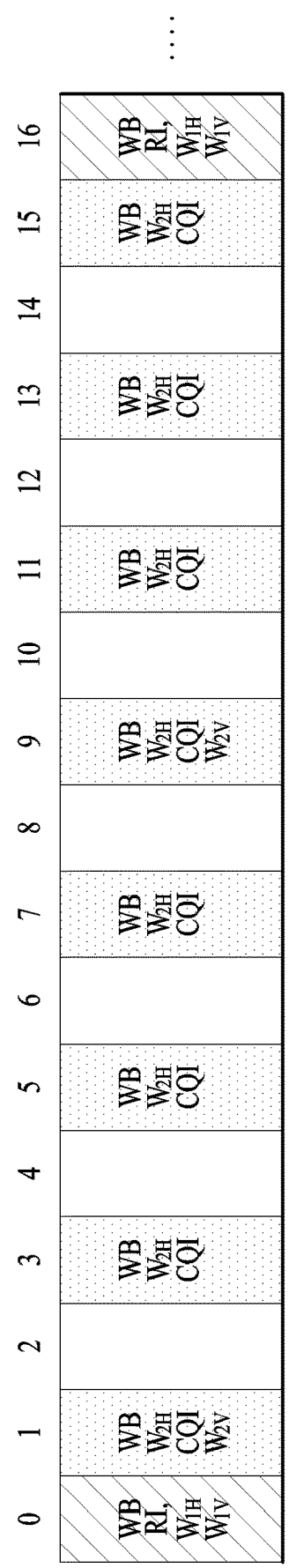
FIGS. 15 to 17 illustrate modified examples for a submode A of a PUCCH CSI report mode 1-1 according to a first embodiment of the present invention.
Figure 16:
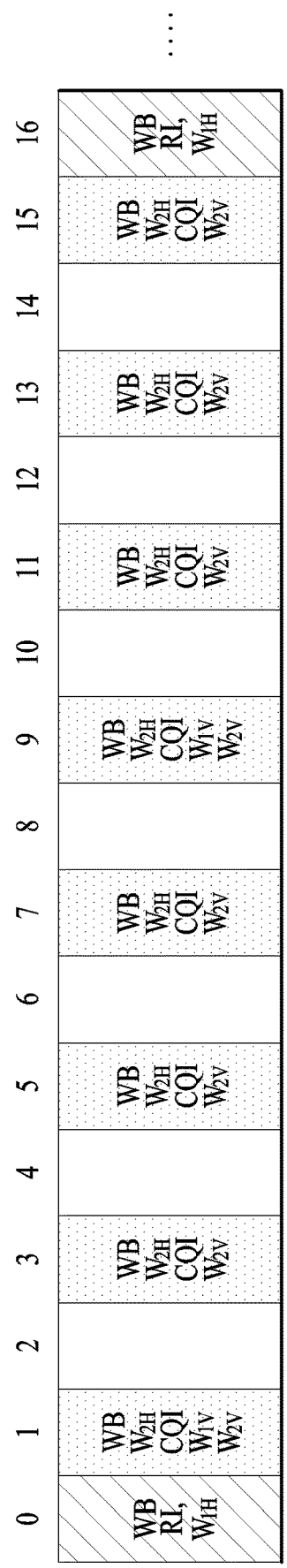
Figure 17:
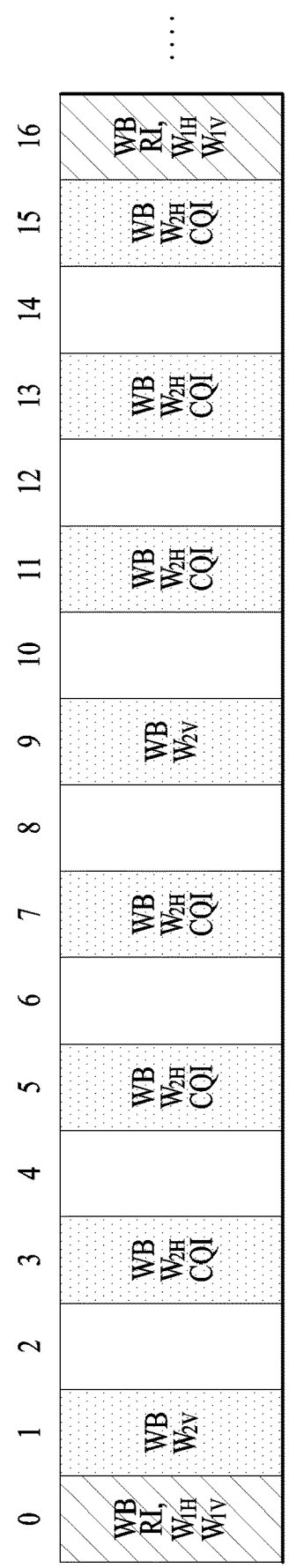

FIGS. 15 to 17 illustrate modified examples for a submode A of a PUCCH CSI report mode 1-1 according to a first embodiment of the present invention.

In particular, FIG. 15 shows a modified example of FIG. 14. In FIG. 15, a reporting type for transmitting CQI is divided into two types.

Referring to FIG. 15, CQI is fed back in a subframe #1 together with $W_{2H}$ and $W_{2V}$ (this is referred to as a reporting type 1). On the contrary, CQI is fed back in a subframe #3 together with $W_{2H}$ only (this is referred to as a reporting type 2). As a result, the $W_{2H}$ can be fed back with high accuracy without separate subsampling or using more bits in the subframe #3. The reporting type 1 may have a period longer than a CQI period as much as N times. In this case, a base station can set the N value to a UE via RRC signaling or the like. In FIG. 15, the N is configured by 4. At the remaining CQI reporting timing except the reporting type 1, the reporting type 2 is reported.

FIG. 16 shows a modified example of FIG. 12. In FIG. 16, a reporting type for transmitting CQI is divided into two types.

Referring to FIG. 16, CQI is fed back in a subframe #1 together with $W_{2H}$, $W_{2V}$, and $W_{1V}$ (this is referred to as a reporting type 3). On the contrary, CQI is fed back in a subframe #3 together with $W_{2H}$ and $W_{2V}$ only (this is referred to as a reporting type 4). As a result, the $W_{2H}$ and the $W_{2V}$ can be fed back with high accuracy using more bits in the subframe #3 compared to the subframe #1. The reporting type 3 may have a period longer than a CQI period as much as N times. In this case, a base station can set the N value to a UE via RRC signaling or the like. In FIG. 16, the N is configured by 4. At the remaining CQI reporting timing except the reporting type 3, the reporting type 4 is reported.

FIG. 17 shows a modified example of FIG. 15. A reporting type is changed in a subframe #1 and a subframe #9 of FIG. 15. Since $W_{2H}$, $W_{2V}$ and CQI are transmitted at the same time in the subframe #1 and the subframe #9 of FIG. 15, a payload size increases. In order to match the payload size with 11-bit capacity of the PUCCH format 2, it is necessary to perform PMI subsampling. In order to prevent performance degradation due to the PMI subsampling, as shown in FIG. 17, a reporting type for independently transmitting $W_{2V}$ only in the subframes #1 and 9 is reported.

Embodiment 2

The embodiment 2 of the present invention relates to a submode B of a PUCCH CSI reporting mode 1-1 of LTE-A system. Before the present invention is explained, a submode B of a legacy PUCCH CSI reporting mode 1-1 is explained.

Figure 18:
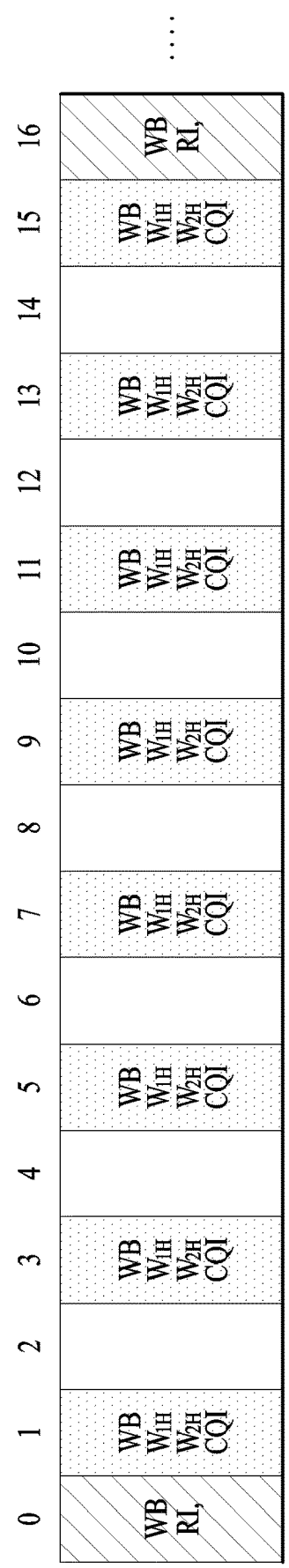
FIG. 18 illustrates an operation example for a submode B of a PUCCH CSI report mode 1-1 of a legacy LTE-A system.

FIG. 18 illustrates an operation example for a submode B of a PUCCH CSI reporting mode 1-1 of a legacy LTE-A system.

Referring to FIG. 18, a feedback period ($N_{pd}$) of CQI corresponds to 2 subframes. Feedback starts at a subframe #1 and the subframe #1 is shaded in FIG. 18. In the present specification, the subframe is referred to as CQI reporting timing.

A feedback period of an RI corresponds to 2*8 subframes and feedback starts at a subframe #0. In a legacy LTE-A system, a base station has horizontal direction antennas only arrayed in one dimension. Hence, all feedback W indicates channel components in horizontal direction. When an RI is fed back, $W_{1H}$ is fed back together. Both the RI and the $W_{1H}$ correspond to WB (wideband) information. When CQI is fed back, $W_2H$ is fed back together. Both the CQI and the $W_{2H}$ correspond to WB (wideband) information.

Figure 19:
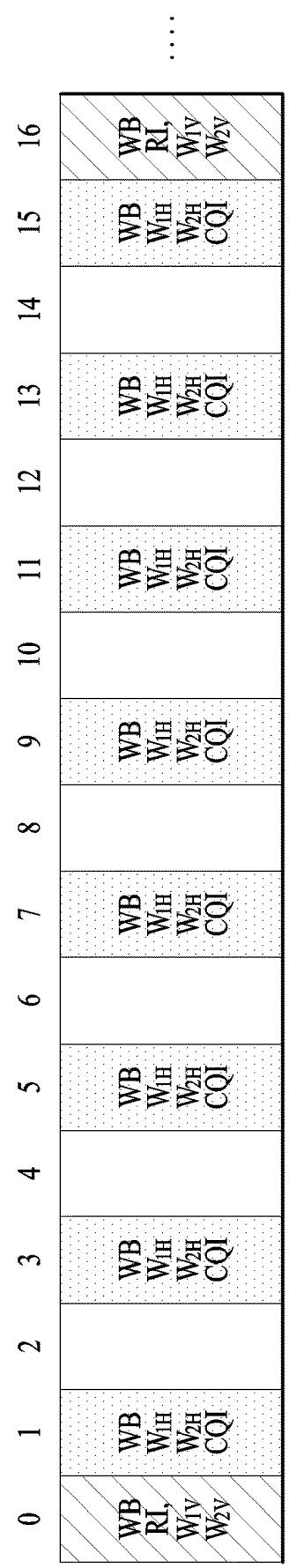
FIG. 19 illustrates an example for a submode B of a PUCCH CSI report mode 1-1 according to a second embodiment of the present invention.

FIG. 19 illustrates an example for a submode B of a PUCCH CSI report mode 1-1 according to a second embodiment of the present invention. In particular, FIG. 19 shows a modified reporting type when vertical direction PMI (i.e., $W_{1V}$ and $W_{2V}$) for FD-MIMO is added on the basis of a legacy submode B.

Referring to FIG. 19, when RI feedback is performed, $W_{1V}$ and $W_{2V}$ are fed back together and all of the $W_{1V}$ and the $W_{2V}$ correspond to WB (wideband) information. If the WB information is transmitted using a PUCCH format 2, in order to maintain a payload size with a size equal to or less than 11 bits, PMI subsampling is applied to the $W_{1V}$ and the $W_{2V}$ before the $W_{1V}$ and the $W_{2V}$ are fed back.

In FIG. 19, W2 information is divided into the $W_{1H}$ and the $W_{2V}$. Yet, it may configure a single W2 codebook without dividing the W2 information into the $W_{2H}$ and the $W_{2V}$. In this case, according to the proposed reporting type, the $W_{2H}$ is replaced with W2 and the $W_{2V}$ is not reported. In FIG. 19, W1 information is divided into the $W_{1H}$ and the $W_{1V}$. Yet, it may configure a single W1 codebook without dividing the W1 information into the $W_{1H}$ and the $W_{1V}$. In this case, the $W_{1H}$ transmitted together with the RI is replaced with W1 and the $W_{1V}$ is not reported.

Figure 20:
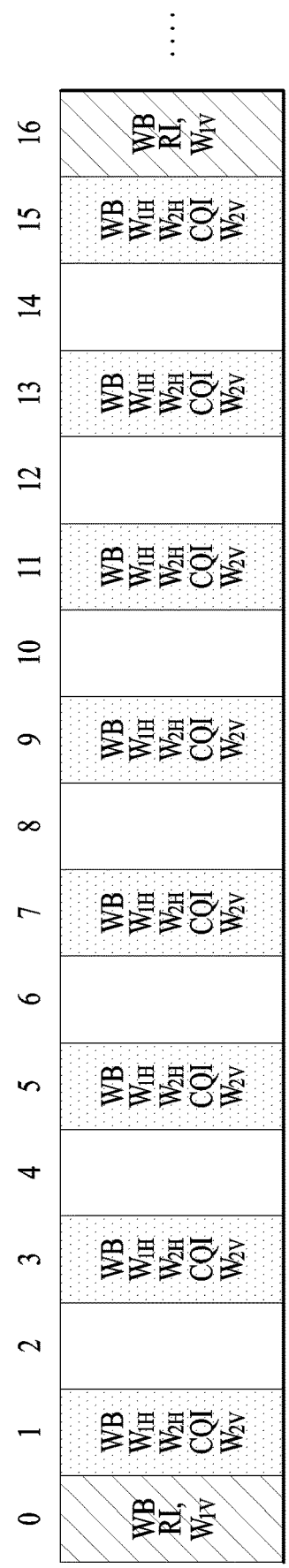
FIG. 20 illustrates a different example for a submode B of a PUCCH CSI report mode 1-1 according to a second embodiment of the present invention.

FIG. 20 illustrates a different example for a submode B of a PUCCH CSI report mode 1-1 according to a second embodiment of the present invention. In particular, FIG. 20 shows a modified reporting type when vertical direction PMI (i.e., $W_{1V}$ and $W_{2V}$) for FD-MIMO is added on the basis of a legacy submode B of FIG. 18.

Referring to FIG. 20, when RI feedback is performed, $W_{1V}$ is fed back together and all of the RI and the $W_{1V}$ correspond to WB (wideband) information. When CQI feedback is performed, $W_{1H}$, $W_{2H}$, and $W_{2V}$ are fed back together and all of the CQI, the $W_{1H}$, the $W_{2H}$, and the $W_{2V}$ correspond to WB (wideband) information. If the WB information is transmitted using a PUCCH format 2, in order to maintain a payload size with a size equal to or less than 11 bits, PMI subsampling is applied to the $W_{1V}$ and the $W_{2V}$ before the $W_{1V}$ and the $W_{2V}$ are fed back.

In FIG. 20, W2 information is divided into the $W_{2H}$ and the $W_{2V}$. Yet, it may configure a single W2 codebook without dividing the W2 information into the $W_{2H}$ and the $W_{2V}$. In this case, according to the proposed reporting type, the $W_{2H}$ is replaced with W2 and the $W_{2V}$ is not reported. And, W1 information is divided into the $W_{1H}$ and the $W_{1V}$. Yet, it may configure a single W1 codebook without dividing the W1 information into the $W_{1H}$ and the $W_{1V}$. In this case, the $W_{1H}$ transmitted together with RI is replaced with W1 and the $W_{1V}$ is not reported.

Figure 21:
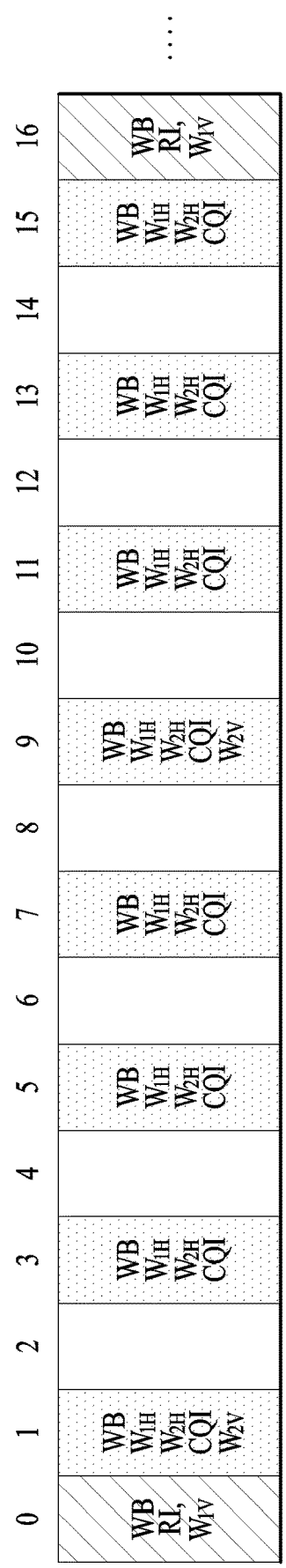
FIG. 21 illustrates a further different example for a submode B of a PUCCH CSI report mode 1-1 according to a second embodiment of the present invention.

FIG. 21 illustrates a further different example for a submode B of a PUCCH CSI report mode 1-1 according to a second embodiment of the present invention. In particular, FIG. 21 shows a modified example of FIG. 20. In FIG. 21, a reporting type for transmitting CQI is divided into two types.

Referring to FIG. 21, CQI is fed back in a subframe #1 together with $W_{1H}$, $W_{2H}$, and $W_{2V}$ (this is referred to as a reporting type 5). On the contrary, CQI is fed back in a subframe #3 together with $W_{1H}$ and $W_{2H}$ only (this is referred to as a reporting type 6). As a result, the $W_{1H}$ and the $W_{2H}$ can be fed back with high accuracy using more bits in the subframe #3 compared to the subframe #1. The reporting type 5 may have a period longer than a CQI period as much as N times. In this case, a base station can set the N value to a UE via RRC signaling or the like. In FIG. 21, the N is configured by 4. At the remaining CQI reporting timing except the reporting type 5, the reporting type 6 is reported.

Figure 22:
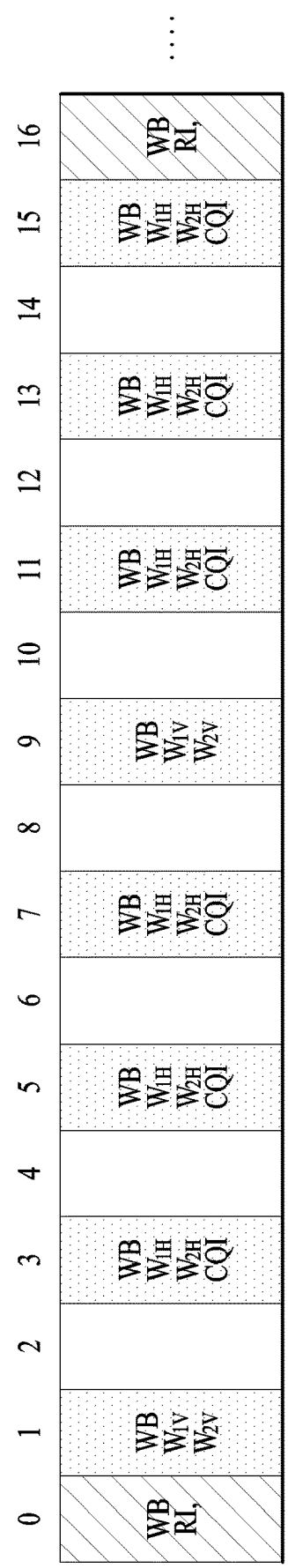
FIG. 22 illustrates a further different example for a submode B of a PUCCH CSI report mode 1-1 according to a second embodiment of the present invention.

FIG. 22 illustrates a further different example for a submode B of a PUCCH CSI report mode 1-1 according to a second embodiment of the present invention. In particular, FIG. 22 shows a modified example of FIG. 19. In FIG. 22, a reporting type transmitted at a feedback period of CQI is divided into two types.

Referring to FIG. 22, CQI is fed back in a subframe #1 and a subframe #9 together with $W_{1V}$ and $W_{2V}$. On the contrary, CQI is fed back at the remaining CQI feedback period together with $W_{1H}$ and $W_{2H}$. As a result, the $W_{1V}$ and $W_{2V}$ can be fed back with high accuracy without separate subsampling using more bits in the subframes #1 and #9. The reporting type of the $W_{1V}$ and $W_{2V}$ may have a period longer than a CQI period as much as N times. In this case, a base station can set the N value to a UE via RRC signaling or the like. In FIG. 22, the N is configured by 4. At the remaining CQI reporting timing except the reporting timing of the $W_{1V}$ and $W_{2V}$, the W1H and the $W_{2H}$ are fed back together with CQI.

Embodiment 3

The embodiment 3 of the present invention relates to a PUCCH CSI reporting mode 2-1 of LTE-A system. Before the present invention is explained, a legacy PUCCH CSI reporting mode 2-1 is explained.

Figure 23:
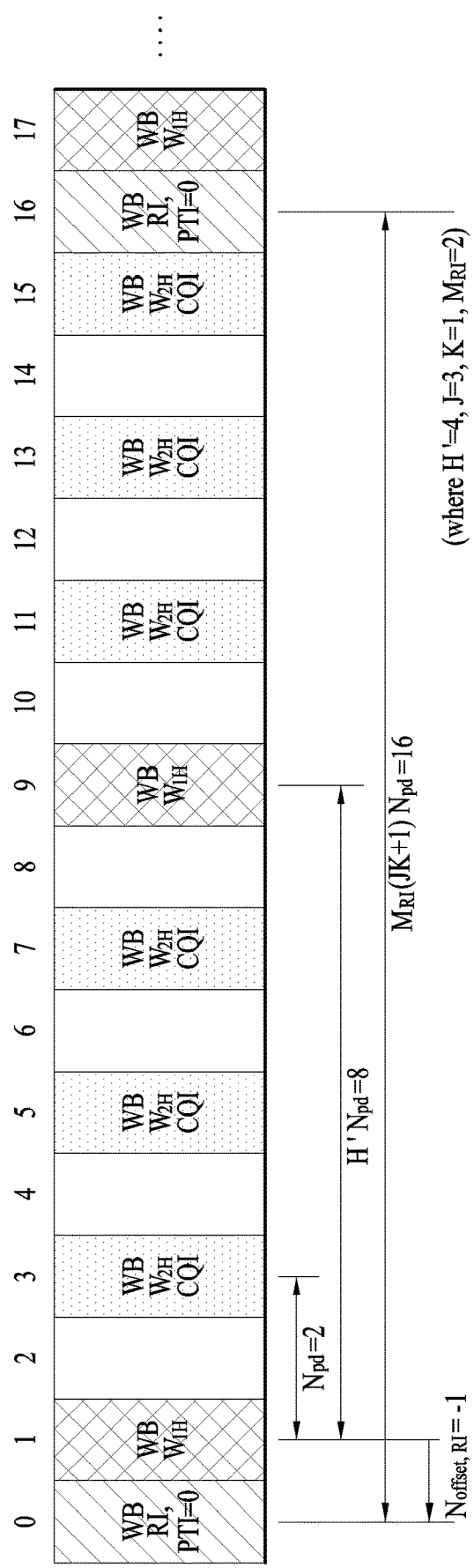
FIGS. 23 and 24 illustrate an operation example for a PUCCH CSI report mode 2-1 of a legacy LTE-A system.
Figure 24:
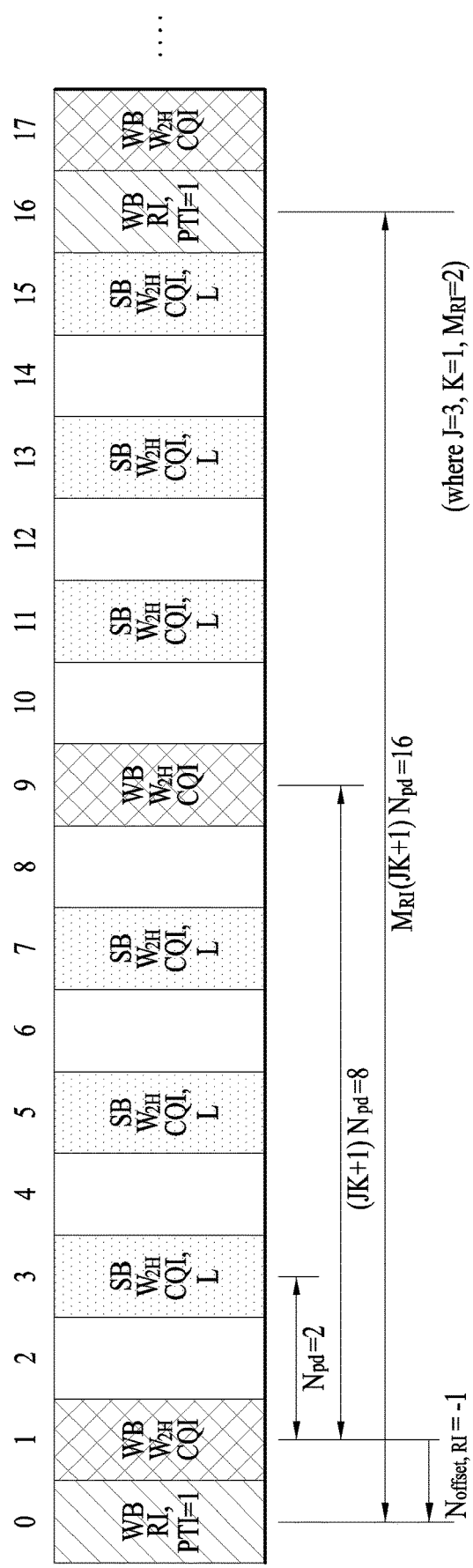

FIGS. 23 and 24 illustrate an operation example for a PUCCH CSI report mode 2-1 of a legacy LTE-A system. Referring to FIGS. 23 and 24, a feedback period ($N_{pd}$) of CQI corresponds to 2 subframes. Feedback starts at a subframe #1 and the subframe #1 is shaded in FIGS. 23 and 24. In the present specification, the subframe is referred to as CQI reporting timing.

A feedback period of an RI corresponds to 2*8 subframes and feedback starts at a subframe #0. In a legacy LTE-A system, a base station has horizontal direction antennas only arrayed in one dimension. Hence, all feedback W indicates channel components in horizontal direction. When an RI is fed back, PTI is fed back together. The RI corresponds to WB (wideband) information.

The PTI may have a value of 0 or 1. As shown in an example of FIG. 23, if the PTI corresponds to 0, a UE feed backs WB CQI, WB $W_{1H}$, and WB $W_{2H}$. The WB $W_{1H}$ is independently fed back to an uplink subframe via a PUCCH format 2 and a period of the WB $W_{1H}$ is determined by a multiple of a CQI period (i.e., $N_{pd}$) signaled via RRC. In FIG. 23, the WB $W_{1H}$ is fed back with a period longer than the CQI period as much as 4 times by configuring H'=4. Among configured CQI reporting timing, WB CQI and the WB $W_{2H}$ are transmitted together at the remaining CQI reporting timing except reporting timing at which the WB $W_{1H}$ is reported.

On the contrary, if the PTI corresponds to 1, as shown in FIG. 24, UE feed backs WB CQI, WB $W_{2H}$, SB CQI, subband selection information, and SB $W_{2H}$. The WB CQI and the WB $W_{2H}$ are transmitted at the same time in a manner of being defined by a single reporting type. A period of the WB CQI and the WB $W_{2H}$ is determined by a multiple of a CQI transmission period. Referring to FIG. 24, if j=3 and k=1 are configured, the WB CQI and the WB $W_{2H}$ are fed back with a period longer than the CQI transmission period as much as 4 times. Among configured CQI reporting timing, the SB CQI, the subband selection information, and the SB $W_{2H}$ are transmitted together at the remaining CQI reporting timing except reporting timing at which the WB CQI and the WB $W_{2H}$ are reported.

When a subband is selected, it means that a subband for maximizing SINR is selected from a BP (bandwidth part) band consisting of a plurality of subbands. A UE feed backs a corresponding subband index in the BP to a base station via L-bit information. The UE selects a best SB CQI and SB $W_{2H}$ from a selected subband and feed backs the best SB CQI and the SB $W_{2H}$. The entire band includes the J number of BPs. In this case, subband selection is performed in a manner of sequentially changing a BP. Referring to FIG. 24, since the J corresponds to 3, there are 3 BPs in total. Hence, the subband selection is performed in a subframe #3, a subframe #5, and a subframe #7 on the basis of a BP 0, a BP 1, and a BP 2, respectively. After the subframe #7 is passed, the UE performs the subband selection on the entire BPs one time. If the subband selection is performed on the entire BPs one time, it is represented as the subband selection is performed on one cycle. K corresponds to a value for determining a cycle number. Since the K corresponds to 1, the UE performs the subband selection one time between reporting timing of two adjacent 'WB CQI+WB $W_{2H}$'.

Consequently, CSI values described in the following are reported at CQI feedback period according to 1-bit PTI value in the mode 2-1.

PTI=0: WB $W_{1H}$, WB $W_{2H}$, WB CQI,
PTI=1: WB $W_{2H}$, WB CQI, SB $W_{2H}$, SB CQI, L

In particular, 1 bit of the PTI indicates band granularity for horizontal direction PMI. Consequently, if the PTI corresponds to 0, the UE feed backs WB horizontal direction PMI and WB CQI. And, if the PTI corresponds to 1, the UE feed backs WB horizontal direction PMI, WB CQI, SB horizontal direction PMI, and SB CQI.

The embodiment 3 of the present invention proposes to modify the legacy PUCCH CSI reporting mode 2-1 into proposals 1 to 13 described in the following.

(a) Proposal 1

First of all, if vertical direction PMI (i.e., $W_{1V}$ and $W_{2V}$) for FD MIMO is added, the proposal 1 proposes to extend PTI to 2 bits in the mode 2-1. CSI values described in the following are reported at CQI feedback period according to a PTI value.

PTI=00: WB $W_{1H}$, WB $W_{2H}$, WB $W_{1V}$, WB $W_{2V}$, WB CQI
PTI=01: WB $W_{2H}$, WB $W_{2V}$, WB CQI, SB $W_{2H}$, SB CQI, L
PTI=10: WB $W_{2H}$, WB $W_{2V}$, WB CQI, SB $W_{2V}$, SB CQI, L
PTI=11: WB $W_{2H}$, WB $W_{2V}$, WB CQI, SB $W_{2V}$, SB CQI, L, SB $W_{2H}$

Among the 2 bits of the PTI, MSB indicates band granularity for vertical direction PMI. In particular, if the MSB corresponds to 0, WB information is transmitted in the vertical direction PMI. If the MSB corresponds to 1, both WB and SB information are transmitted. On the contrary, LSB indicates band granularity for horizontal direction PMI. In particular, if the LSB corresponds to 0, WB information is transmitted in the horizontal direction PMI. If the LSB corresponds to 1, both WB and SB information are transmitted.

(b) Proposal 2—PTI=00

Figure 25:
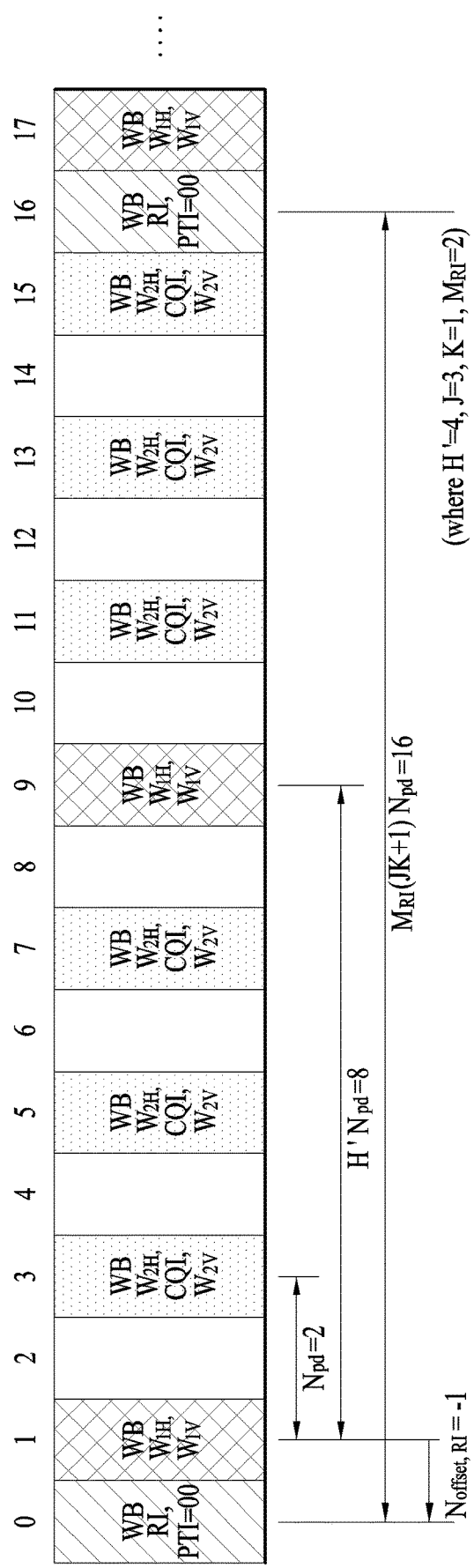
FIG. 25 illustrates an operation example for a PUCCH CSI report mode 2-1 according to a proposal 2 of a third embodiment of the present invention.

FIG. 25 illustrates an operation example for a PUCCH CSI report mode 2-1 according to a proposal 2 of a third embodiment of the present invention. In particular, FIG. 25 is a diagram illustrating a modified reporting type when vertical direction PMI (i.e., $W_{1V}$ and $W_{2V}$) is added on the basis of the legacy PUCCH CSI reporting mode 2-1. When an RI is fed back, 2-bit PTI=00 is fed back together.

Referring to FIG. 25, WB $W_{1H}$ and WB $W_{1V}$ are transmitted together at the WB $W_{1H}$ period shown in FIG. 23. Among configured CQI reporting timing, WB CQI, WB $W_2H$, and WB $W_{2V}$ are transmitted together at the remaining CQI reporting timing except reporting timing at which the WB $W_{1H}$ and the WB $W_{1V}$ are reported. If the information is transmitted using a PUCCH format 2, in order to maintain a payload size with a size equal to or less than 11 bits, PMI subsampling is applied to the $W_{2H}$ and the $W_{2V}$ before the $W_{2H}$ and the $W_{2V}$ are fed back.

In FIG. 25, W2 information is divided into the $W_{2H}$ and the $W_{2V}$. Yet, it may configure a single W2 codebook without dividing the W2 information into the $W_{2H}$ and the $W_{2V}$. In this case, according to the proposed reporting type, the $W_{2H}$ is replaced with W2 and the $W_{2V}$ is not reported. And, W1 information is divided into the $W_{1H}$ and the $W_{1V}$. Yet, it may configure a single W1 codebook without dividing the W1 information into the $W_{1H}$ and the $W_{1V}$. In this case, the $W_{1H}$ is replaced with W1 and the $W_{1V}$ is not reported.

(c) Proposal 3—PTI=01

Figure 26:
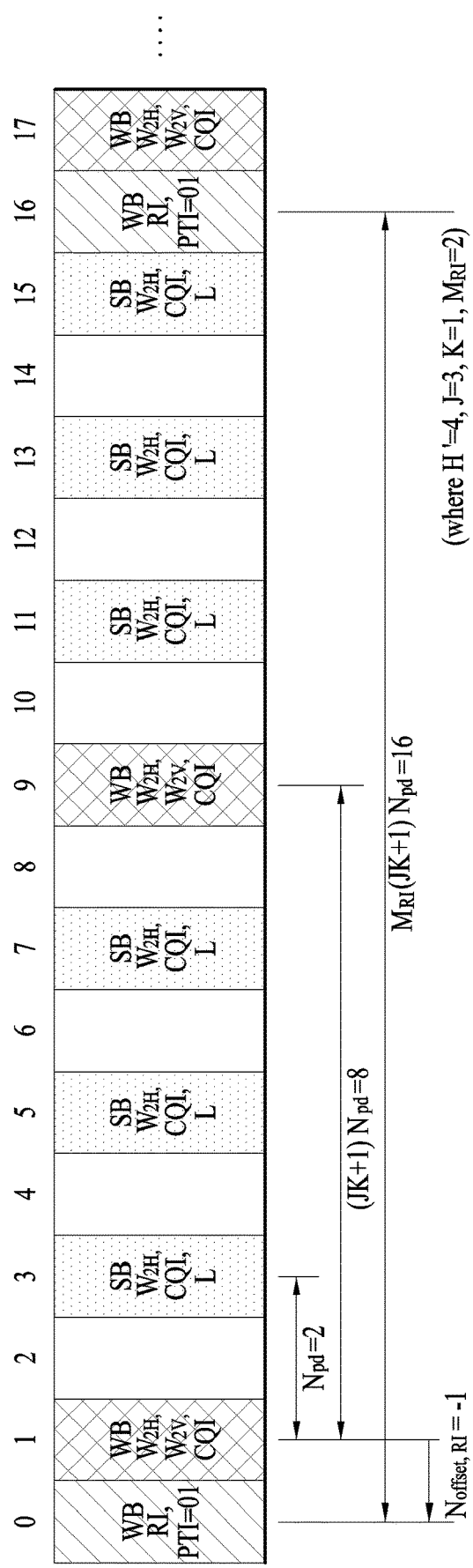
FIG. 26 illustrates an operation example for a PUCCH CSI report mode 2-1 according to a proposal 3 of a third embodiment of the present invention.

FIG. 26 illustrates an operation example for a PUCCH CSI report mode 2-1 according to a proposal 3 of a third embodiment of the present invention. In particular, FIG. 26 is a diagram illustrating a case that vertical direction PMI (i.e., $W_{1V}$ and $W_{2V}$) is added on the basis of the legacy PUCCH CSI reporting mode 2-1 mentioned earlier in FIG. 24. When an RI is fed back, 2-bit PTI=01 is fed back together.

Referring to FIG. 26, $W_{2H}$, WB CQI, and $W_{2V}$ are transmitted together at the WB $W_{2H}$ and the WB CQI periods shown in FIG. 24. If the information is transmitted using a PUCCH format 2, in order to maintain a payload size with a size equal to or less than 11 bits, PMI subsampling is applied to the $W_{2H}$ and the $W_{2V}$ before the $W_{2H}$ and the $W_{2V}$ are fed back. Among configured CQI reporting timing, SB CQI, L (i.e., subband selection information), and SB $W_{2H}$ are transmitted together at the remaining CQI reporting timing except reporting timing at which the WB $W_{1H}$ and the WB $W_{1V}$ are reported. If the information is transmitted using a PUCCH format 2, in order to maintain a payload size with a size equal to or less than 11 bits, PMI subsampling is applied to the $W_{2H}$ before the $W_{2H}$ is fed back.

In FIG. 26, W2 information is divided into the $W_{2H}$ and the $W_{2V}$. Yet, it may configure a single W2 codebook without dividing the W2 information into the $W_{2H}$ and the $W_{2V}$. In this case, the $W_{2H}$ is replaced with W2 and the $W_{2V}$ is not reported. In this case, since the SB W2 corresponds to a codebook that the SB $W_{2H}$ and SB $W_{2V}$ are combined, it may be able to configure a PMI index corresponding to the SB $W_{2V}$ not to be transmitted in the SB W2 by applying PMI subsampling to the SB W2.

(d) Proposal 4—PTI=01

Figure 27:
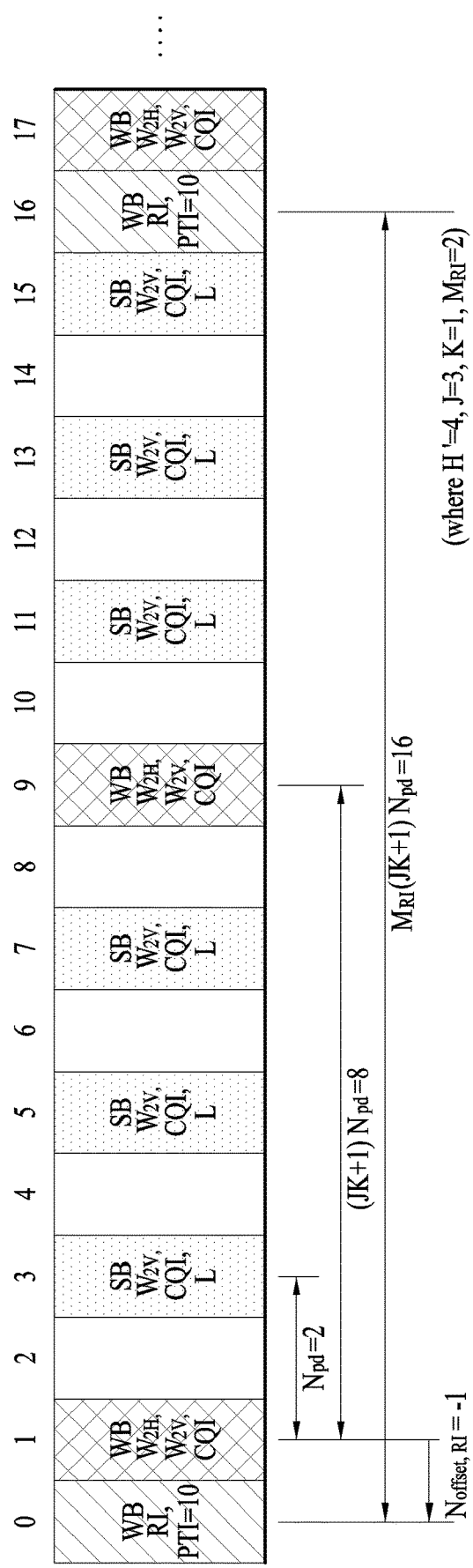
FIG. 27 illustrates an operation example for a PUCCH CSI report mode 2-1 according to a proposal 4 of a third embodiment of the present invention.

FIG. 27 illustrates an operation example for a PUCCH CSI report mode 2-1 according to a proposal 4 of a third embodiment of the present invention. In particular, FIG. 27 is a diagram illustrating a case that vertical direction PMI (i.e., $W_{1V}$ and $W_{2V}$) is added on the basis of the legacy PUCCH CSI reporting mode 2-1 mentioned earlier in FIG. 24. When an RI is fed back, 2-bit PTI=01 is fed back together.

Referring to FIG. 27, $W_{2H}$, WB CQI, and $W_{2V}$ are transmitted together at the WB $W_{2H}$ and the WB CQI periods shown in FIG. 24. If the information is transmitted using a PUCCH format 2, in order to maintain a payload size with a size equal to or less than 11 bits, PMI subsampling is applied to the $W_{2H}$ and the $W_{2V}$ before the $W_{2H}$ and the $W_{2V}$ are fed back. Among configured CQI reporting timing, SB CQI, L (i.e., subband selection information), and SB $W_{2H}$ are transmitted together at the remaining CQI reporting timing except reporting timing at which the WB $W_{1H}$ and the WB $W_{1V}$ are reported. If the information is transmitted using a PUCCH format 2, in order to maintain a payload size with a size equal to or less than 11 bits, PMI subsampling is applied to the $W_{2H}$ before the $W_{2H}$ is fed back.

In FIG. 27, W2 information is divided into the $W_{2H}$ and the $W_{2V}$. Yet, it may configure a single W2 codebook without dividing the W2 information into the $W_{2H}$ and the $W_{2V}$. In this case, the $W_{2H}$ is replaced with W2 and the $W_{2V}$ is not reported. In this case, since the SB W2 corresponds to a codebook that the SB $W_{2H}$ and SB $W_{2V}$ are combined, it may be able to configure a PMI index corresponding to the SB $W_{2V}$ not to be transmitted in the SB W2 by applying PMI subsampling to the SB W2.

In PTI=01 and PTI=10, a reporting period of WB PMI and WB CQI is determined by JK+1 times of $N_{pd}$. According to the legacy LTE-A system, a base station informs a UE of K value per CSI process and J value is fixed by a single value according to a system bandwidth. Yet, the present invention proposes that the base station signals a plurality of K values according to a CSI process and informs the UE of a different K value according to a PTI value.

For example, in PTI=01 and PTI=10, K=1 and K=2 can be configured, respectively. And, J value is determined according to PTI and a system bandwidth. As a different example, a table for determining J value according to a system bandwidth in PTI=01 may be different from a table for determining J value according to a system bandwidth in PTI=10. As a further different example, while J value is determined using a table for determining the J value according to a system bandwidth in PTI=01, J value as much as K times of the J value can be determined in PTI=10. In this case, a base station informs a UE of the K or the UE informs the base station of the K.

A subband size may vary depending on a system bandwidth. A subband size when subband PMI corresponds to vertical direction PMI and a subband size when subband PMI corresponds to horizontal direction PMI can be differently configured. For example, a bandwidth for determining a subband size for horizontal direction PMI compared to a subband size mapping table and a bandwidth for determining a subband size for vertical direction PMI compared to a subband size mapping table may exist, respectively.

As a different example, a subband size for horizontal direction PMI is determined by a bandwidth according to a legacy LTE-A spec and a subband size for vertical direction PMI is determined by a subband size greater than the subband size for horizontal direction PMI as much as K times. In this case, a base station can inform a UE of the K via RRC/MAC layer signaling or dynamic signaling. Or, the UE may inform the base station of the K. If the subband size for the horizontal direction PMI is different from the subband size for the vertical direction PMI, a subband size of CQI can be determined by a minimum value or a maximum value of the subband size for the horizontal direction PMI and the subband size for the vertical direction PMI.

(e) Proposal 5—PTI=11

Figure 28:
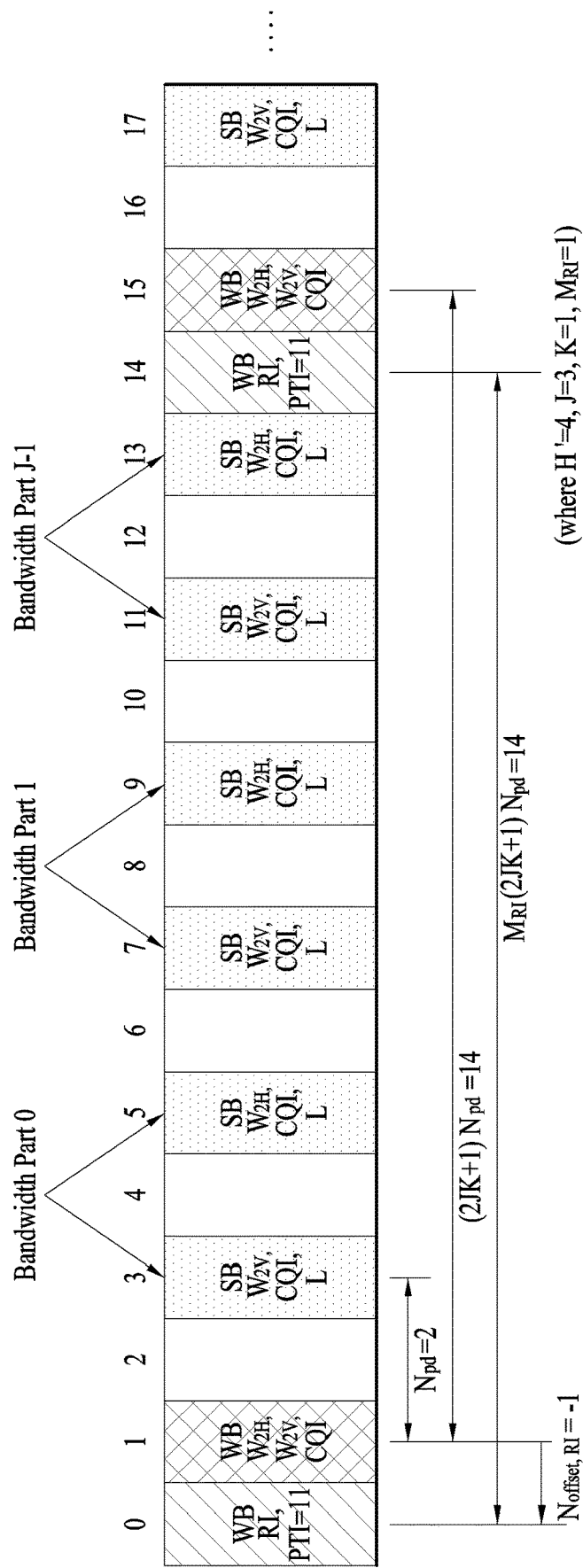
FIG. 28 illustrates an operation example for a PUCCH CSI report mode 2-1 according to a proposal 5 of a third embodiment of the present invention.

FIG. 28 illustrates an operation example for a PUCCH CSI report mode 2-1 according to a proposal 5 of a third embodiment of the present invention. In particular, FIG. 28 is a diagram illustrating a case that vertical direction PMI (i.e., $W_{1V}$ and $W_{2V}$) is added on the basis of the legacy PUCCH CSI reporting mode 2-1 mentioned earlier in FIG. 24. When an RI is fed back, 2-bit PTI=11 is fed back together.

Referring to FIG. 28, $W_{2H}$, WB CQI, and $W_{2V}$ are transmitted together at the WB $W_{2H}$ and the WB CQI periods shown in FIG. 24. If the information is transmitted using a PUCCH format 2, in order to maintain a payload size with a size equal to or less than 11 bits, PMI subsampling is applied to the $W_{2H}$ and the $W_{2V}$ before the $W_{2H}$ and the $W_{2V}$ are fed back.

Among configured CQI reporting timing, a reporting type 7 and a reporting type 8 are alternatively reported at the remaining CQI reporting timing except reporting timing at which the WB $W_{1H}$ and the WB $W_{1V}$ are reported. If CSI information is transmitted using a PUCCH format 2 in each reporting type, in order to maintain a payload size with a size equal to or less than 11 bits, PMI subsampling is applied to the $W_{2H}$ and the $W_{2V}$ before the $W_{2H}$ and the $W_{2V}$ are fed back.

reporting type 7: SB CQI, L (i.e., subband selection information), SB $W_{2V}$
  reporting type 8: SB CQI, L (i.e., subband selection information), SB $W_{2H}$ Unlike the aforementioned proposals, the reporting types 7 and 8 are defined according to a subband PMI type in the proposal 5 and one subband PMI is generated by combining the two reporting types. Hence, it is necessary to configure the reporting type 7 and the reporting type 8, which are reported at adjacent timing, using PMI on the same subband within the same BR In order to guarantee this, referring to FIG. 28, the reporting type 7 and the reporting type 8, which are reported in a subframe #3 and a subframe #5, respectively, are calculated for the same subband (i.e., L value is the same) within a BP 0. A BP and a subband relation between the reporting type 7 and the reporting type 8 which are reported in a subframe #7 and a subframe #9, respectively, are the same. And, a BP and a subband relation between the reporting type 7 and the reporting type 8 which are reported in a subframe #11 and a subframe #13, respectively, are the same.

Since L information of the reporting type 7 is identical to L information of the reporting type 8, L reporting can be omitted in at least one of the reporting type 7 and the reporting type 8. If the reporting type 7 and the reporting type 8 are redefined as follows, it may be able to more efficiently report CSI.

Reporting type 7: SB $W_{2V}$, SB
  Reporting type 8: SB CQI, L (i.e., subband selection information)

Since the maximum capacity of a PUCCH format 2 is restricted to 11 bits, if a reporting type is reconfigured according to what is mentioned above, it may report PMI without any separate subsampling.

As shown in FIG. 28, if a change period of a BP is changed, it also influences on periods of WB PMI, WB CQI, and RI. Although the periods of the WB PMI and the WB CQI are previously determined as (JK+1) $N_{pd}$, the periods can be determined by (2JK+1)$N_{pd}$ depending on a proposed scheme. Although the period of the RI is previously determined as $M_{RI}$ (JK+1) $N_{pd}$, the period can be determined by $M_{RI}$ (2JK+1) $N_{pd}$ depending on a proposed scheme.

In FIG. 28, W2 information is divided into the $W_{2H}$ and the $W_{2V}$. Yet, it may configure a single W2 codebook without dividing the W2 information into the $W_{2H}$ and the $W_{2V}$. In this case, the $W_{2H}$ and the $W_{2V}$ are replaced with W2. In this case, in case of SB W2 transmitted in the reporting type 7, it may be able to configure a PMI index corresponding to the SB $W_{2H}$ not to be transmitted in the SB W2 by applying PMI subsampling to the SB W2. Similarly, in case of SB W2 transmitted in the reporting type 8, it may be able to configure a PMI index corresponding to the SB $W_{2V}$ not to be transmitted in the SB W2 by applying PMI subsampling to the SB W2.

In the aforementioned proposals 2 to 5, a reporting type for reporting two PMI (i.e., $W_{2H}$ and $W_{2V}$ or $W_{1H}$ and $W_{1V}$) at a time is defined. In case of reporting using a PUCCH format 2, due to the 11-bit capability restriction, the proposed reporting type is unable to transmit the whole PMI. Hence, it is necessary to reduce granularity of PMI via subsampling. Hence, when a reporting type is designed, it is necessary to exclude a case of reporting two or more PMI and CQI at a time.

If a case of reporting two or more PMI and CQI at a time is excluded, the proposals 2 to 5 can be modified into proposals described in the following.

proposal 2→proposal 6 or proposal 10
  proposal 3→proposal 7
  proposal 4→proposal 8
  proposal 5→proposal 9

(f) Proposal 6

A proposal 6 corresponds to a variation of the proposal 2. It may be able to improve a case of reporting WB $W_{2V}$, WB $W_{2H}$, and WB CQI at the same time in the proposal 2. According to the proposal 6, a UE alternately reports a reporting type 9 and a reporting type 10 at the timing at which the WB $W_{2V}$, the WB $W_{2H}$, and the WB CQI are simultaneously reported in the proposal 2.

Figure 29:
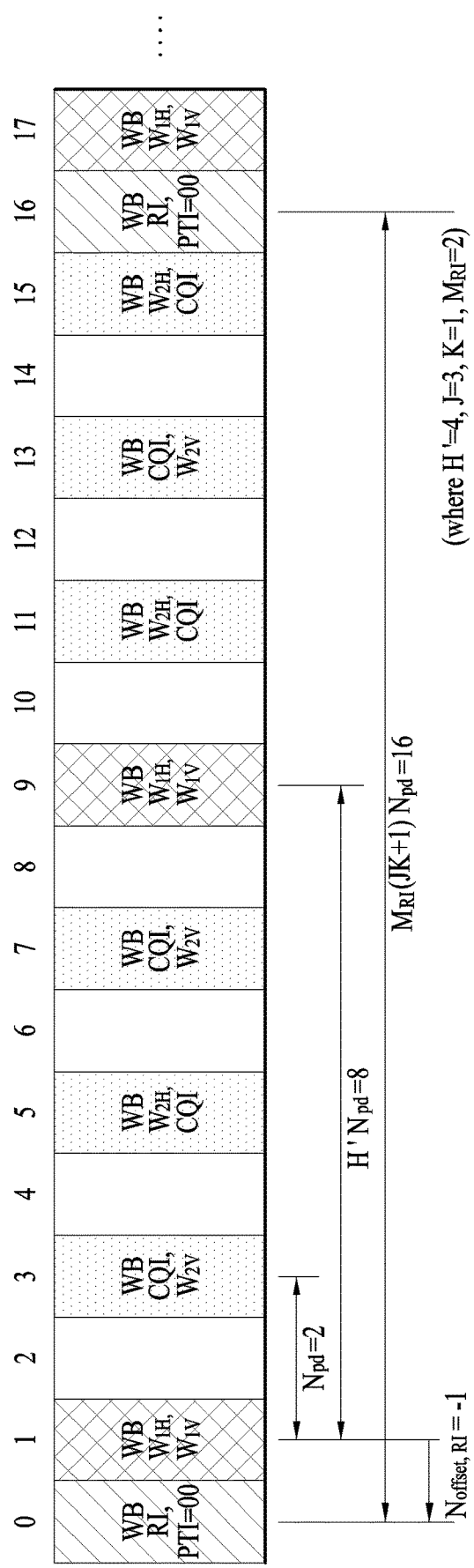
FIG. 29 illustrates an operation example for a PUCCH CSI report mode 2-1 according to a proposal 6 of a third embodiment of the present invention.

FIG. 29 illustrates an operation example for a PUCCH CSI report mode 2-1 according to a proposal 6 of a third embodiment of the present invention. Referring to FIG. 29, it is able to see that a reporting type 9, a reporting type 10, and the reporting type 9 are reported in a subframe #3, a subframe #5, and a subframe #7, respectively.

reporting type 9: WB $W_{2V}$, WB CQI
  reporting type 10: WB $W_{2H}$, WB CQI

In addition to the alternate reporting, a base station can change a reporting frequency of a reporting type 9 and a reporting frequency of a reporting type 10. For example, it may be able to configure the reporting type 10 to be performed P times during the reporting type 9 is reported two times.

In FIG. 29, according to the proposed reporting type, W2 information is divided into $W_{2H}$ and $W_{2V}$. Yet, it may configure a single W2 codebook without dividing the W2 information into the $W_{2H}$ and the $W_{2V}$. In this case, the $W_{2H}$ and the $W_{2V}$ are replaced with W2. Yet, subsampling is applied to the W2 at the timing at which the $W_{2V}$ is to be transmitted to perform feedback in the remaining PMI except the $W_{2H}$. And, subsampling is applied to the W2 at the timing at which the $W_{2H}$ is to be transmitted to perform feedback in the remaining PMI except the $W_{2V}$.

(g) Proposals 7 to 9

A proposal 7 corresponds to a variation of the proposal 3. It may be able to improve a case of reporting WB $W_{2V}$, WB $W_{2H}$, and WB CQI at the same time in the proposal 3. According to the proposal 7, a UE alternately reports a reporting type 9 and a reporting type 10 at the timing at which the WB $W_{2V}$, the WB $W_{2H}$, and the WB CQI are simultaneously reported in the proposal 3.

Figure 30:
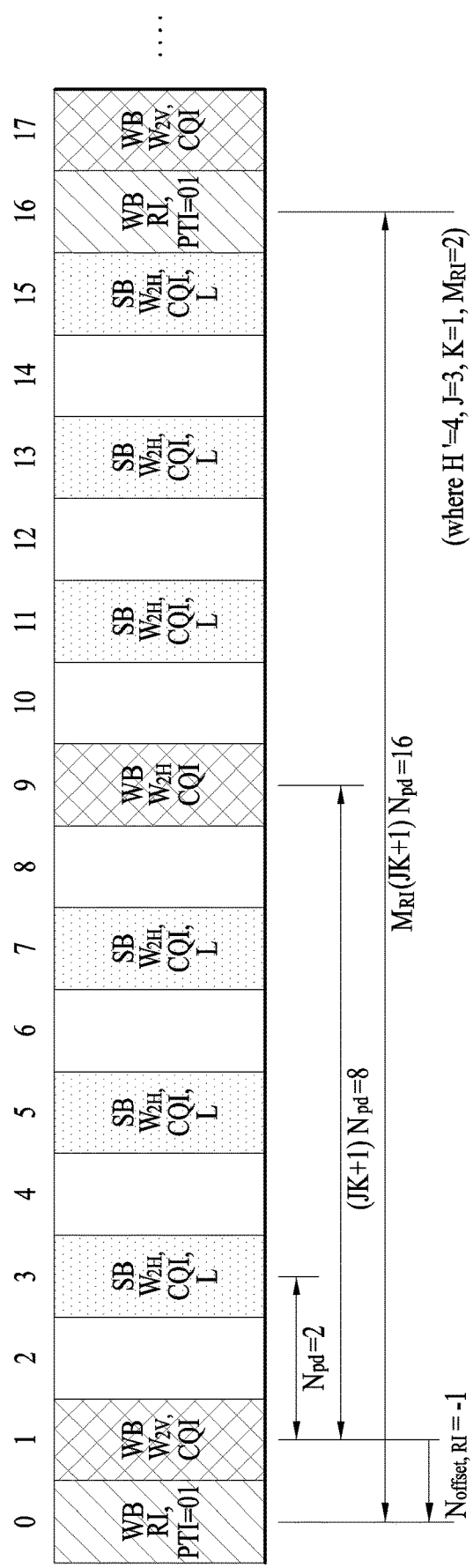
FIG. 30 illustrates an operation example for a PUCCH CSI report mode 2-1 according to a proposal 7 of a third embodiment of the present invention.

FIG. 30 illustrates an operation example for a PUCCH CSI report mode 2-1 according to a proposal 7 of a third embodiment of the present invention. Referring to FIG. 30, it is able to see that a reporting type 9, a reporting type 10, and the reporting type 9 are reported in a subframe #1, a subframe #9, and a subframe #17, respectively.

In addition to the alternate reporting, a base station can change a reporting frequency of a reporting type 9 and a reporting frequency of a reporting type 10. For example, it may be able to configure a reporting period of the reporting type 9 by P(JK+1) $N_{pd}$ and configure the reporting type 10 to be reported in the remaining subframes configured by a period of (JK+1) $N_{pd}$.

Figure 31:
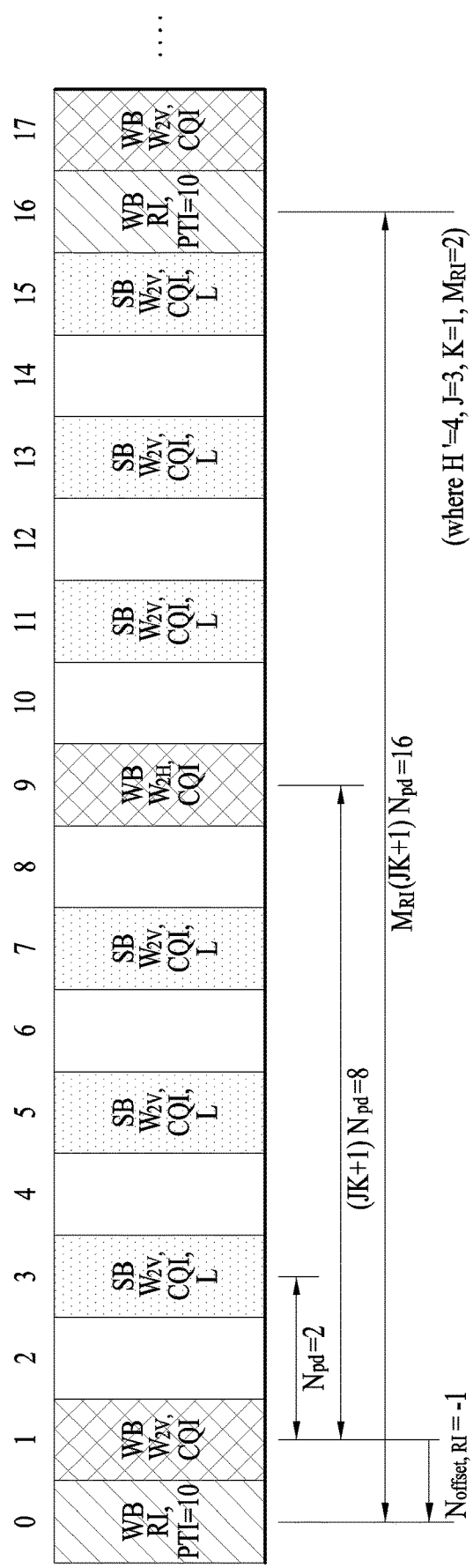
FIGS. 31 and 32 illustrate operation examples for a PUCCH CSI report mode 2-1 according to a proposal 8 and a proposal 9 of a third embodiment of the present invention.
Figure 32:
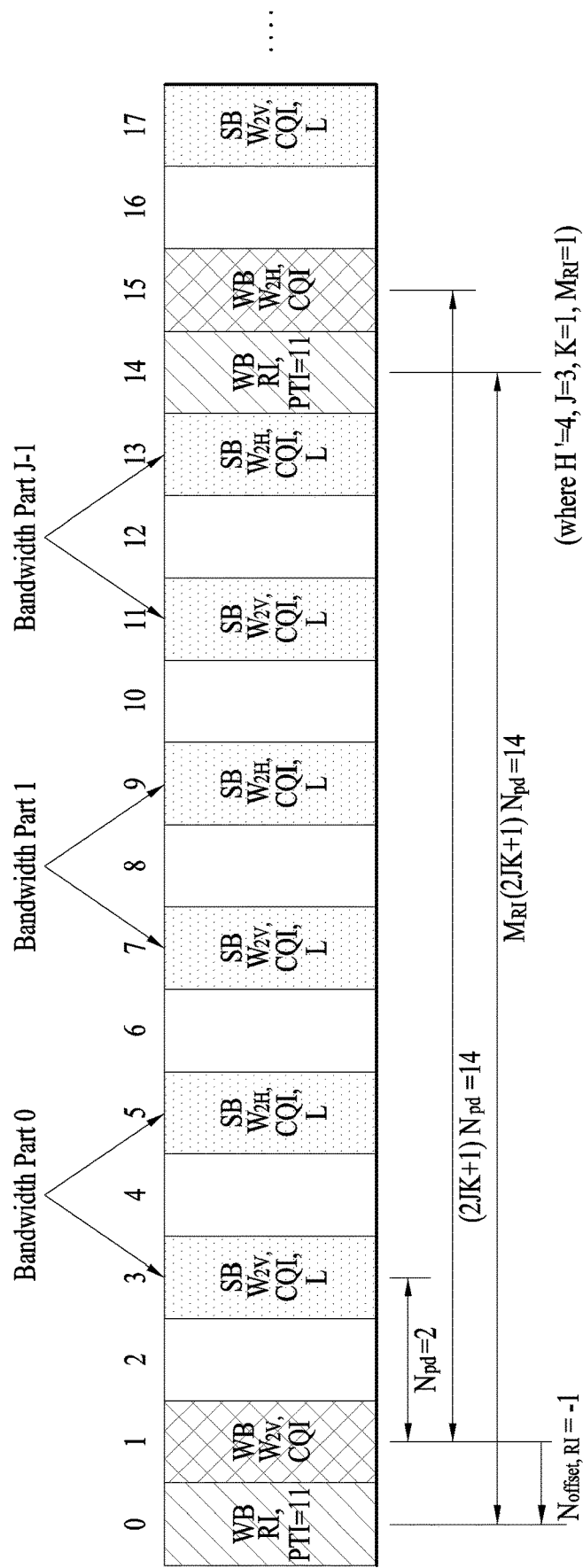

The proposals 8 and 9 can be considered by respectively modifying the proposal 4 and the proposal 5 using the scheme mentioned earlier in the proposal 7. Examples of the proposals 8 and 9 are shown in FIG. 31 and FIG. 32, respectively. FIGS. 31 and 32 illustrate operation examples for a PUCCH CSI report mode 2-1 according to a proposal 8 and a proposal 9 of a third embodiment of the present invention.

(h) Proposal 10

A proposal 10 corresponds to a variation of the proposal 2. It may be able to improve a case of reporting WB $W_{2V}$, WB $W_{2H}$, and WB CQI at the same time. According to the proposal 10, a UE reports the WB $W_{2H}$ and the WB CQI only at the timing at which the WB $W_{2V}$, the WB $W_{2H}$, and the WB CQI are simultaneously reported in the proposal 2. According to the proposal 10, a UE reports WB $W_{2V}$, WB $W_{1H}$, and WB $W_{1V}$ at the timing at which the WB $W_{1H}$ and the WB $W_{1V}$ are simultaneously reported in the proposal 2.

Figure 33:
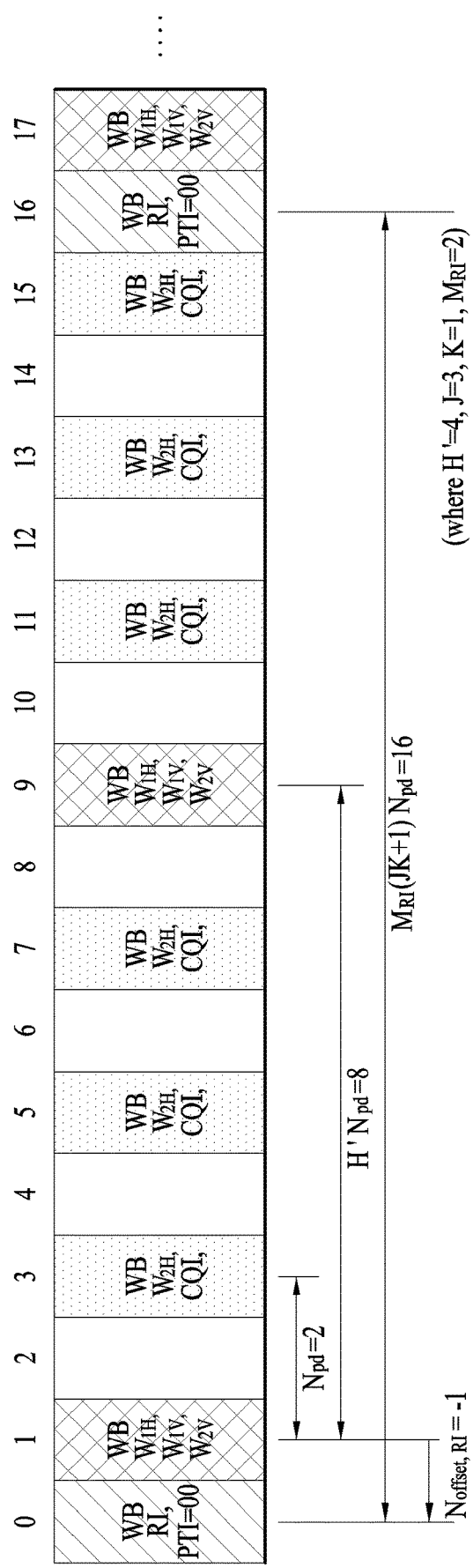
FIG. 33 illustrates an operation example for a PUCCH CSI report mode 2-1 according to a proposal 10 of a third embodiment of the present invention.

FIG. 33 illustrates an operation example for a PUCCH CSI report mode 2-1 according to a proposal 10 of a third embodiment of the present invention. Referring to FIG. 33, WB $W_{2V}$, WB $W_{1H}$, and WB $W_{1V}$ are reported together in a subframe #1, a subframe #9, and a subframe #17, and WB $W_{2H}$ and WB CQI are reported together in a subframe #3, a subframe #5, a subframe #7, a subframe #11, a subframe #13, and a subframe #15.

(i) Proposal 11

The aforementioned proposal 1 has proposed that PTI is extended to 2 bits. The present proposal 11 proposes that a reporting type is defined according to a PTI value.

PTI=00: WB $W_{1H}$, WB $W_{2H}$, WB $W_{1V}$, WB $W_{2V}$, WB CQI

PTI=01: WB $W_{2H}$, WB CQI, SB $W_{2H}$, SB CQI, L

PTI=10: WB $W_{2V}$, WB CQI, SB $W_{2V}$, SB CQI, L

PTI=11: WB $W_{2H}$, WB $W_{2V}$, WB CQI, SB $W_{2V}$, SB CQI, L, SB $W_{2H}$

When PTI corresponds to 00 and 11, it is identical to the proposal 1. Yet, if the PTI corresponds to 01, a UE does not report vertical direction PMI and reports horizontal direction PMI only. If the PTI corresponds to 10, the UE does not report horizontal direction PMI and reports vertical direction PMI only.

Figure 34:
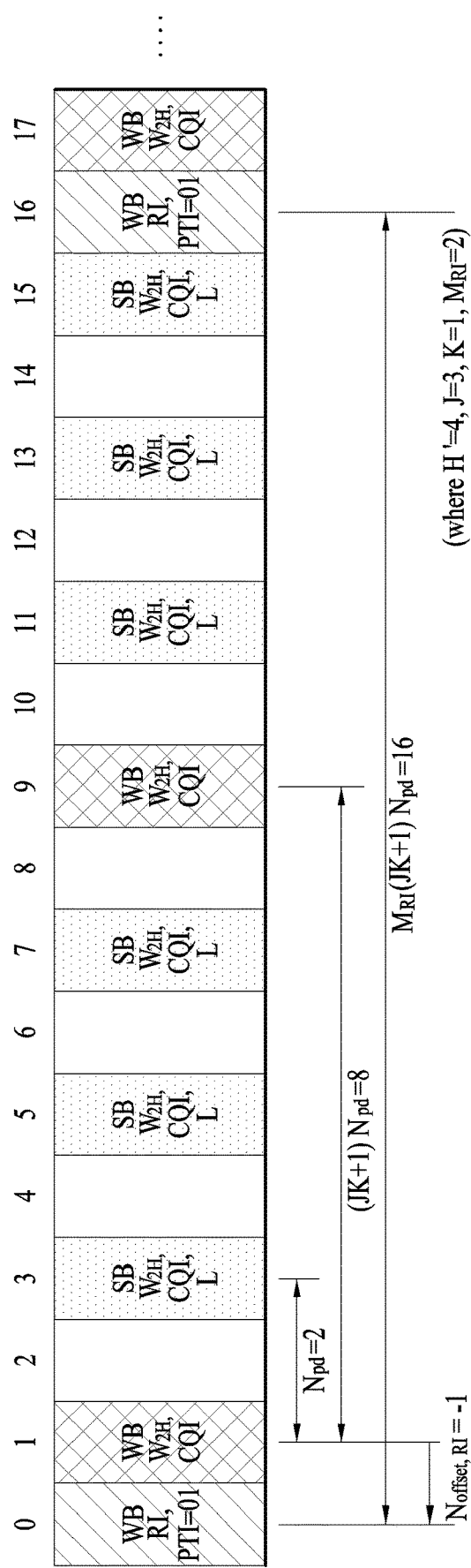
FIGS. 34 and 35 illustrate operation examples for a PUCCH CSI report mode 2-1 according to a proposal 11 of a third embodiment of the present invention.
Figure 35:
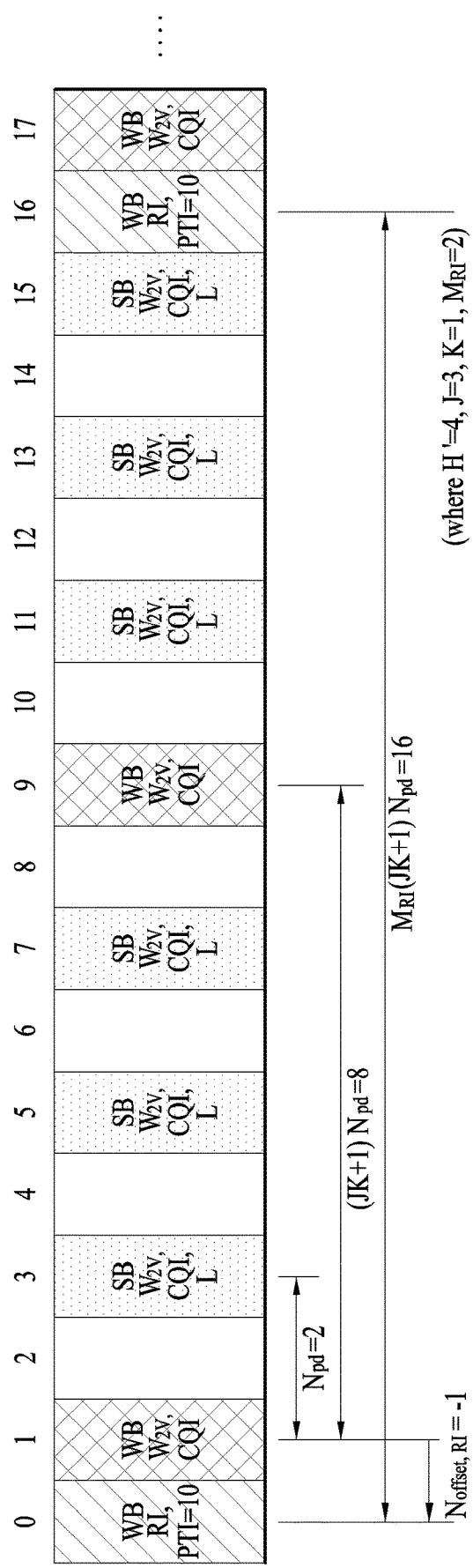

FIGS. 34 and 35 illustrate operation examples for a PUCCH CSI report mode 2-1 according to a proposal 11 of a third embodiment of the present invention. In particular, FIG. 34 and FIG. 35 illustrate a representative example when PTI corresponds to 01 and when PTI corresponds to 10, respectively.

In the foregoing description, various reporting types are defined according to a PTI value of 2 bits. This proposal is valid not only for a case that PTI is extended to 2 bits but also for a case that PTI is maintained by 1 bit. In particular, it is able to use the proposed reporting type by mapping 1-bit PTI to two cases among four cases of 2-bit PTI. For example, if 1-bit PTI corresponds to 0, it is interpreted as being identical to PTI=00. If 1-bit PTI corresponds to 1, it is interpreted as being identical to PTI=01. By doing so, it may be able to use a reporting type proposed when the PTI corresponds to 00 and a reporting type proposed when the PTI corresponds to 01.

(j) Proposal 12

According to the aforementioned proposals, a UE can select and report whether or not SB PMI feedback is performed on horizontal/vertical direction PMI by extending PTI to 2 bits. In addition, it may also consider a scheme that both a base station and a UE determine and report on whether or not SB PMI feedback is performed on horizontal/vertical direction PMI. In this case, the PTI is represented by 1 bit and is selected by the UE. PUCCH CSI reporting mode 2-1 is divided into a submode A and a submode B. The base station selects one from among the modes and informs the UE of the selected mode.

(1) In this case, a combination of 1-bit PTI and a submode operates in a manner of being identical to the 2-bit PTI.

PTI=00←☐PTI=0 and reporting mode 2-1 submode A

PTI=01←☐PTI=1 and reporting mode 2-1 submode A

PTI=00←☐PTI=0 and reporting mode 2-1 submode B

PTI=10←☐PTI=1 and reporting mode 2-1 submode B

In particular, if PTI corresponds to 0, it operates similar to PTI=00 irrespective of a submode. If PTI corresponds to 1, it operates similar to PTI=01 in a submode A and it operates similar to PTI=10 in a submode A. In case of interpreting according to the 2-bit PTI definition, consequently, a base station selects a submode A or a submode B to determine whether a UE is able to perform SB PMI report on vertical direction PMI or horizontal direction PMI.

Based on the aforementioned discussion, each PTI can be defined by reporting types described in the following.

PTI=00: WB $W_{1H}$, WB $W_{2H}$, WB $W_{1V}$, WB $W_{2V}$, WB CQI

PTI=01: WB $W_{2H}$, WB $W_{2V}$, WB CQI, SB $W_{2H}$, SB CQI, L

PTI=00: WB $W_{1H}$, WB $W_{2H}$, WB $W_{1V}$, WB $W_{2V}$, WB CQI

PTI=10: WB $W_{2H}$, WB $W_{2V}$, WB CQI, SB $W_{2V}$, SB CQI, L (2) As a different proposed scheme, as shown in the following, it may consider a combination of 1-bit PTI and a submode.

PTI=00←☐PTI=0 and reporting mode 2-1 submode A

PTI=01←☐PTI=1 and reporting mode 2-1 submode A

PTI=00←☐PTI=0 and reporting mode 2-1 submode B

PTI=10←☐PTI=1 and reporting mode 2-1 submode B

Similarly, if PTI corresponds to 0, it operates similar to PTI=00 irrespective of a submode. If PTI corresponds to 1, PTI operates similar to 01 in a submode A and PTI operates similar to 11 in a submode B. In case of interpreting according to the 2-bit PTI definition, consequently, a base station selects a submode A or a submode B to determine whether a UE is able to perform SB PMI report on horizontal direction PMI only or the UE is able to perform SB PMI report on both horizontal direction PMI and vertical direction PMI.

Based on the aforementioned discussion, each PTI can be defined by reporting types described in the following.

PTI=00: WB $W_{1H}$, WB $W_{2H}$, WB $W_{1V}$, WB $W_{2V}$, WB CQI

PTI=01: WB $W_{2H}$, WB $W_{2V}$, WB CQI, SB $W_{2H}$, SB CQI, L

PTI=00: WB $W_{1H}$, WB $W_{2H}$, WB $W_{1V}$, WB $W_{2V}$, WB CQI

PTI=11: WB $W_{2H}$, WB $W_{2V}$, WB CQI, SB $W_{2V}$, SB CQI, L, SB $W_{2H}$

Figure 36:
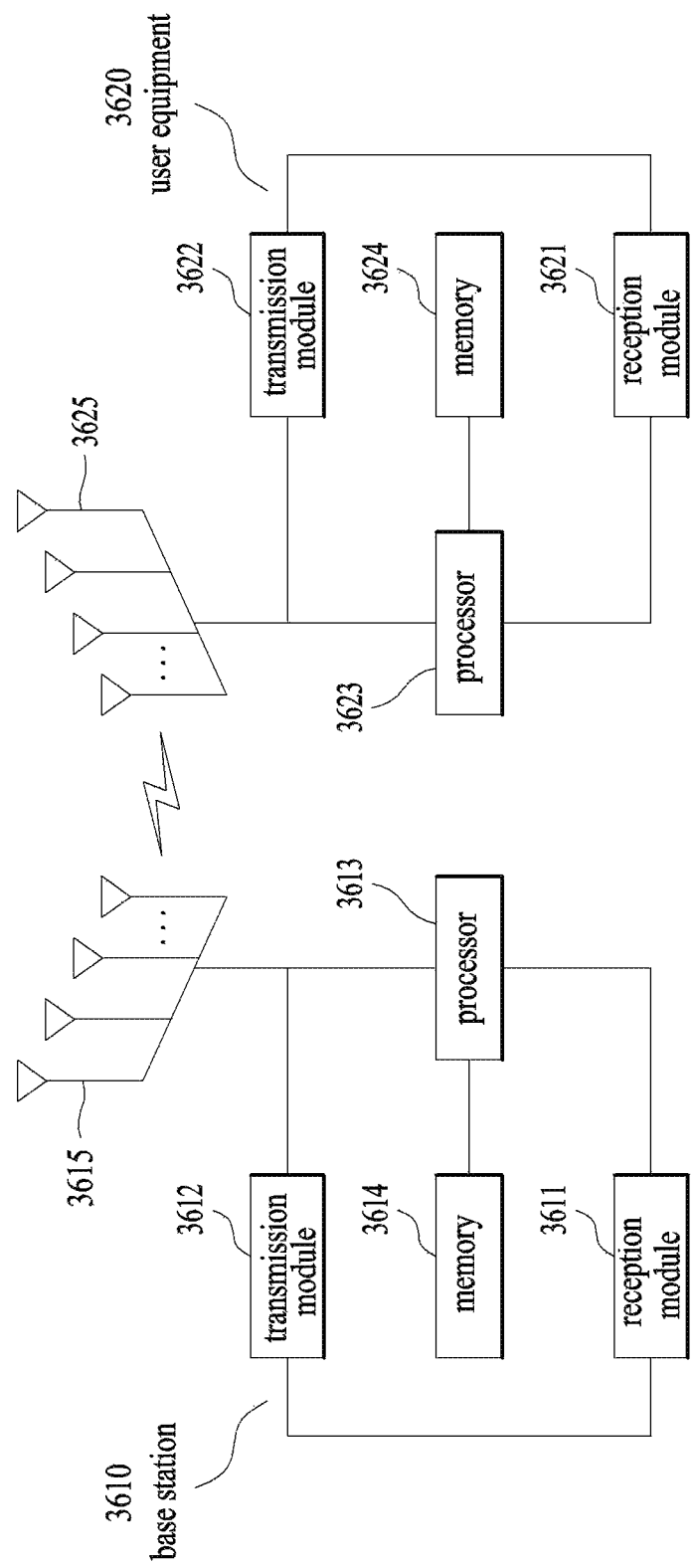
FIG. 36 is a diagram for a configuration of a base station and a user equipment applicable to one embodiment of the present invention.

FIG. 36 is a diagram for a base station and a user equipment capable of being applied to an embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 36, a wireless communication system includes a base station (BS) 3610 and a user equipment (UE) 3620. The BS 3610 includes a processor 3613, a memory 3614 and a radio frequency (RF) units 3611/3612. The processor 3613 can be configured to implement the proposed functions, processes and/or methods. The memory 3614 is connected with the processor 3613 and then stores various kinds of information associated with an operation of the processor 3613. The RF units 3611/3612 are connected with the processor 3613 and transmits and/or receives a radio signal. The user equipment 3620 includes a processor 3623, a memory 3624 and a radio frequency (RF) unit 3621/3622. The processor 3623 can be configured to implement the proposed functions, processes and/or methods. The memory 3624 is connected with the processor 3623 and then stores various kinds of information associated with an operation of the processor 3623. The RF unit 3621/3622 is connected with the processor 3623 and transmits and/or receives a radio signal. The base station 3610 and/or the user equipment 3620 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

Detailed explanation on the preferred embodiment of the present invention disclosed as mentioned in the foregoing description is provided for those in the art to implement and execute the present invention. While the present invention has been described and illustrated herein with reference to the preferred embodiments thereof, it will be apparent to those skilled in the art that various modifications and variations can be made therein without departing from the spirit and scope of the invention. For instance, those skilled in the art can use each component described in the aforementioned embodiments in a manner of combining it with each other. Hence, the present invention may be non-limited to the aforementioned embodiments of the present invention and intends to provide a scope matched with principles and new characteristics disclosed in the present invention.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The present invention can be used for a wireless communication device such as a terminal, a relay, a base station and the like.

What is claimed is:
1. A method of reporting channel status information (CSI) to a base station by a user equipment in a wireless access system, the method comprising:
 transmitting first CSI containing a rank indicator (RI) and a precoding type indicator (PTI) to the base station in a unit of a first period;

transmitting second CSI containing both a vertical direction precoding matrix index (PMI) for a wideband and a horizontal direction PMI for the wideband to the base station in a unit of a second period within the first period, wherein the wideband is divided into a plurality of subbands;

transmitting third CSI containing a vertical direction PMI for a specific subband, selected from the plurality of subbands, to the base station in a unit of a third period within the second period; and transmitting fourth CSI containing a horizontal direction PMI for the specific subband to the base station in a unit of a fourth period same as the third period, wherein the third CSI and the fourth CSI are alternatively reported, wherein the third CSI does not contain the horizontal direction PMI for the specific subband, and the fourth CSI does not contain the vertical direction PMI for the specific subband, and wherein the fourth CSI is calculated for the specific subband that is the same as the specific subband, selected from the plurality of subbands, for combining the vertical direction PMI for the specific subband and the horizontal direction PMI for the specific subband.

2. The method of claim 1, wherein the third CSI and the fourth CSI contain subband selection information for selecting the specific subband from the plurality of subbands.

3. The method of claim 2, wherein reporting of the subband selection information is omitted in at least one of the third CSI and the fourth CSI.

4. The method of claim 1, wherein the second CSI, the third CSI and the fourth CSI comprise a channel quality indicator.

5. A method of receiving channel status information (CSI) from a user equipment by a base station in a wireless access system, the method comprising:

receiving first CSI containing a rank indicator (RI) and a precoding type indicator (PTI) from the user equipment in a unit of a first period;

receiving second CSI containing both a vertical direction precoding matrix index (PMI) for a wideband and a horizontal direction PMI for the wideband from the user equipment in a unit of a second period within the first period, wherein the wideband is divided into a plurality of subbands;

receiving third CSI containing a vertical direction PMI for a specific subband, selected from the plurality of subbands, from the user equipment in a unit of a third period within the second period; and receiving fourth CSI containing a horizontal direction PMI for the specific subband from the user equipment in a unit of a fourth period same as the third period, wherein the third CSI and the fourth CSI are alternatively reported, wherein the third CSI does not contain the horizontal direction PMI for the specific subband, and the fourth CSI does not contain the vertical direction PMI for the specific subband, and wherein the fourth CSI is calculated for the specific subband that is the same as the specific subband, selected from the plurality of subbands, for combining the vertical direction PMI for the specific subband and the horizontal direction PMI for the specific subband.

6. The method of claim 5, wherein the third CSI and the fourth CSI contain subband selection information for selecting the specific subband from the plurality of subbands.

7. The method of claim 6, wherein reporting of the subband selection information is omitted in at least one of the third CSI and the fourth CSI.

8. The method of claim 5, wherein the second CSI, the third CSI and the fourth CSI comprise a channel quality indicator.

* * * * *